(12) United States Patent
Baikov et al.

(10) Patent No.: US 8,250,522 B2
(45) Date of Patent: Aug. 21, 2012

(54) METHOD AND SYSTEM FOR GENERATING A WEB SERVICES META MODEL ON THE JAVA STACK

(75) Inventors: Chavdar S. Baikov, Sofia (BG);
Dimitar Angelov, Montana (BG);
Vladimir Savchenko, Sofia (BG);
Alexander Zubev, Pazardjik (BG);
Dimitrina Stoyanova, Elhovo (BG)

(73) Assignee: SAP AG, Walldorf (DE)

( * ) Notice: Subject to any disclaimer, the term of this patent is extended or adjusted under 35 U.S.C. 154(b) by 1213 days.

(21) Appl. No.: 11/238,873

(22) Filed: Sep. 28, 2005

(65) Prior Publication Data

US 2007/0073769 A1   Mar. 29, 2007

(51) Int. Cl.
*G06F 9/44* (2006.01)

(52) U.S. Cl. ......... 717/106; 717/104; 717/114; 717/120

(58) Field of Classification Search ........................ None
See application file for complete search history.

(56) References Cited

U.S. PATENT DOCUMENTS

| | | | |
|---|---|---|---|
| 6,202,207 B1 | 3/2001 | Donohue | |
| 6,604,113 B1 | 8/2003 | Kenyon et al. | |
| 6,954,792 B2 | 10/2005 | Kang et al. | |
| 7,159,224 B2 * | 1/2007 | Sharma et al. | 719/310 |
| 7,184,922 B2 | 2/2007 | Ousley et al. | |
| 7,231,435 B2 | 6/2007 | Ohta | |
| 7,277,935 B2 | 10/2007 | Sato | |
| 7,284,039 B2 * | 10/2007 | Berkland et al. | 709/219 |
| 7,373,661 B2 | 5/2008 | Smith et al. | |
| 7,409,709 B2 | 8/2008 | Smith et al. | |
| 7,421,495 B2 | 9/2008 | Yang et al. | |
| 7,467,162 B2 | 12/2008 | Rosenbloom et al. | |
| 7,617,480 B2 * | 11/2009 | Falter et al. | 717/106 |
| 7,640,348 B2 | 12/2009 | Atwal et al. | |
| 7,673,282 B2 * | 3/2010 | Amaru et al. | 717/104 |
| 7,693,955 B2 | 4/2010 | Karakashian | |
| 7,698,684 B2 | 4/2010 | Baikov | |
| 7,831,693 B2 | 11/2010 | Lai | |
| 7,877,725 B2 * | 1/2011 | Vitanov et al. | 717/106 |
| 7,877,726 B2 * | 1/2011 | Sabbouh | 717/106 |
| 7,945,893 B2 * | 5/2011 | Angrish et al. | 717/106 |
| 8,099,709 B2 * | 1/2012 | Baikov et al. | 717/104 |
| 2001/0029604 A1 | 10/2001 | Dreyband et al. | |
| 2002/0143819 A1 | 10/2002 | Han et al. | |

(Continued)

FOREIGN PATENT DOCUMENTS

EP   1318461 A1   6/2003

(Continued)

OTHER PUBLICATIONS

Brambilla et al., Model-driven design and development of semantic Web service applications, Nov. 2007, 31 pages, <http://delivery.acm.org/10.1145/1300000/1294151/a3-brambilla.pdf>.*

(Continued)

*Primary Examiner* — Thuy Dao
(74) *Attorney, Agent, or Firm* — Schwegman, Lundberg & Woessner, P.A.

(57) ABSTRACT

A method and system for creating a common model. In one embodiment, a web services model and a web service client model are identified. The web services and web services client models are then unified to create a common model.

11 Claims, 14 Drawing Sheets

U.S. PATENT DOCUMENTS

| | | | |
|---|---|---|---|
| 2003/0004746 A1 | 1/2003 | Kheirolomoom et al. | |
| 2003/0005181 A1 | 1/2003 | Bau et al. | |
| 2003/0055878 A1 | 3/2003 | Fletcher et al. | |
| 2003/0084056 A1 | 5/2003 | DeAnna et al. | |
| 2003/0110242 A1 | 6/2003 | Brown et al. | |
| 2003/0110373 A1 | 6/2003 | Champion | |
| 2003/0163450 A1 | 8/2003 | Borenstein et al. | |
| 2003/0191803 A1 | 10/2003 | Chinnici et al. | |
| 2003/0204645 A1 | 10/2003 | Sharma et al. | |
| 2003/0208505 A1 | 11/2003 | Mullins et al. | |
| 2003/0226139 A1 | 12/2003 | Lee | |
| 2004/0003033 A1 | 1/2004 | Kamen et al. | |
| 2004/0015564 A1 | 1/2004 | Williams | |
| 2004/0017392 A1 | 1/2004 | Welch | |
| 2004/0045005 A1 | 3/2004 | Karakashian | |
| 2004/0054969 A1 | 3/2004 | Chiang et al. | |
| 2004/0068554 A1 | 4/2004 | Bales et al. | |
| 2004/0088352 A1 | 5/2004 | Kurth | |
| 2004/0181537 A1 | 9/2004 | Chawla et al. | |
| 2004/0199896 A1 | 10/2004 | Goodman et al. | |
| 2004/0216086 A1* | 10/2004 | Bau | 717/114 |
| 2005/0080801 A1 | 4/2005 | Kothandaraman et al. | |
| 2005/0091087 A1 | 4/2005 | Smith et al. | |
| 2005/0091639 A1* | 4/2005 | Patel | 717/114 |
| 2005/0114394 A1 | 5/2005 | Kaipa et al. | |
| 2005/0125524 A1 | 6/2005 | Chandrasekhar et al. | |
| 2005/0138041 A1 | 6/2005 | Alcorn et al. | |
| 2005/0154785 A1 | 7/2005 | Reed et al. | |
| 2005/0172261 A1* | 8/2005 | Yuknewicz et al. | 717/106 |
| 2005/0216488 A1 | 9/2005 | Petrov et al. | |
| 2005/0246656 A1 | 11/2005 | Vasilev et al. | |
| 2005/0273703 A1 | 12/2005 | Doughan | |
| 2005/0278270 A1 | 12/2005 | Carr et al. | |
| 2006/0004746 A1 | 1/2006 | Angus et al. | |
| 2006/0015625 A1 | 1/2006 | Ballinger et al. | |
| 2006/0029054 A1 | 2/2006 | Breh et al. | |
| 2006/0031433 A1 | 2/2006 | Patrick et al. | |
| 2006/0041636 A1 | 2/2006 | Ballinger et al. | |
| 2006/0136351 A1 | 6/2006 | Angrish et al. | |
| 2006/0173984 A1 | 8/2006 | Emeis et al. | |
| 2006/0190580 A1 | 8/2006 | Shu et al. | |
| 2006/0200748 A1 | 9/2006 | Shenfield | |
| 2006/0200749 A1 | 9/2006 | Shenfield | |
| 2006/0206890 A1 | 9/2006 | Shenfield et al. | |
| 2006/0236302 A1* | 10/2006 | Bateman et al. | 717/104 |
| 2006/0236306 A1 | 10/2006 | DeBruin et al. | |
| 2007/0050482 A1 | 3/2007 | Sundstrom et al. | |
| 2007/0064680 A1 | 3/2007 | Savchenko et al. | |
| 2007/0073221 A1 | 3/2007 | Bialecki et al. | |
| 2007/0073753 A1 | 3/2007 | Baikov | |
| 2007/0073760 A1 | 3/2007 | Baikov | |
| 2007/0073769 A1 | 3/2007 | Baikov et al. | |
| 2007/0073771 A1 | 3/2007 | Baikov | |
| 2007/0073849 A1 | 3/2007 | Baikov | |
| 2007/0118844 A1 | 5/2007 | Huang et al. | |
| 2007/0156872 A1 | 7/2007 | Stoyanova | |
| 2007/0203820 A1 | 8/2007 | Rashid | |
| 2007/0245167 A1 | 10/2007 | De La Cruz et al. | |
| 2008/0189713 A1 | 8/2008 | Betzler et al. | |
| 2008/0307392 A1* | 12/2008 | Racca et al. | 717/120 |
| 2010/0077070 A1 | 3/2010 | Baikov et al. | |

FOREIGN PATENT DOCUMENTS

| | | |
|---|---|---|
| EP | 1387262 A1 | 2/2004 |
| EP | 1566940 A1 | 8/2005 |
| WO | WO-03073309 A1 | 9/2003 |

OTHER PUBLICATIONS

Barrett et al., Model driven distribution pattern design for dynamic web service compositions, Jul. 2006, 8 pages, <http://delivery.acm.org/10.1145/1150000/1145612/p129-barrett.pdf>.*

Anwar et al., Multi-agent Based Semantic E-government Web Service Architecture Using Extended WSDL, Dec. 2006, 4 pages, <http://delivery.acm.org/10.1145/1200000/1194805/27490599.pdf>.*

"U.S. Appl. No. 11/238,244 , Non-Final Office Action mailed Dec. 17, 2009", 24 Pgs.

"U.S. Appl. No. 11/238,912 , Final Office Action mailed Jan. 20, 2010", 8 pgs.

"U.S. Appl. No. 11/238,921, Notice of Allowance mailed Nov. 19, 2009", 7 pgs.

"U.S. Appl. No. 10/749,666, Non Final Office Action mailed Nov. 24, 2008", 13 pgs.

"U.S. Appl. No. 10/749,735 , Non Final Office Action mailed Mar. 17, 2008", 27 pgs.

"U.S. Appl. No. 10/750,058, Non Final Office Action mailed Dec. 23, 2008", 12 pgs.

"U.S. Appl. No. 11/232,660, Non Final Office Action mailed Dec. 22, 2008", 18 pgs.

"U.S. Appl. No. 11/232,717, Non Final Office Action mailed Feb. 26, 2009", 18 pgs.

"U.S. Appl. No. 11/233,203, Non Final Office Action mailed Jan. 27, 2009", 14 pgs.

"U.S. Appl. No. 11/238,244, Advisory Action mailed Sep. 21, 2009", 3 pgs.

"U.S. Appl. No. 11/238,244, Final Office Action mailed Jun. 3, 2009", 24 pgs.

"U.S. Appl. No. 11/238,244, Non Final Office Action mailed Oct. 27, 2008", 21 pgs.

"U.S. Appl. No. 11/238,244, Response filed Feb. 27, 2009 to Non Final Office Action mailed Oct. 27, 2008", 13 pgs.

"U.S. Appl. No. 11/238,244, Response filed Sep. 3, 2009 to Final Office Action mailed Jun. 3, 2009", 11 pgs.

"U.S. Appl. No. 11/238,244, Response filed Oct. 5, 2009 to Advisory Action mailed Sep. 21, 2009", 14 pgs.

"U.S. Appl. No. 11/238,912, Advisory Action mailed Jul. 9, 2008", 3 pgs.

"U.S. Appl. No. 11/238,912, Final Office Action mailed Feb. 4, 2009", 9 pgs.

"U.S. Appl. No. 11/238,912, Final Office Action mailed Apr. 30, 2008", 9 pgs.

"U.S. Appl. No. 11/238,912, Non Final Office Action mailed Jun. 26, 2009", 12 pgs.

"U.S. Appl. No. 11/238,912, Non Final Office Action mailed Sep. 10, 2008", 9 pgs.

"U.S. Appl. No. 11/238,912, Non Final Office Action mailed Nov. 16, 2007", 10 pgs.

"U.S. Appl. No. 11/238,912, Preliminary Amendment filed Jul. 30, 2008", 10 pgs.

"U.S. Appl. No. 11/238,912, Response filed Jan. 11, 2008 to Non Final Office Action mailed Nov. 16, 2007", 9 pgs.

"U.S. Appl. No. 11/238,912, Response filed Apr. 17, 2009 to Final Office Action mailed Feb. 4, 2009", 11 pgs.

"U.S. Appl. No. 11/238,912, Response filed Jun. 20, 2008 to Final Office Action mailed Apr. 30, 2008", 10 pgs.

"U.S. Appl. No. 11/238,912, Response filed Oct. 31, 2008 to Non Final Office Action mailed Sep. 10, 2008", 11 pgs.

"U.S. Appl. No. 11/238,912, Response filed Sep. 28, 2009 to Non Final Office Action mailed Jun. 26, 2009", 10 pgs.

"U.S. Appl. No. 11/238,920 , Non Final Office Action mailed Mar. 12, 2009", 10 pgs.

"U.S. Appl. No. 11/238,921, Non Final Office Action mailed Oct. 30, 2008", 12 pgs.

"U.S. Appl. No. 11/238,921, Notice of Allowance mailed Sep. 3, 2009", 14 pgs.

"U.S. Appl. No. 11/238,921, Response filed Mar. 2, 2009 to Non Final Office Action mailed Oct. 30, 2008", 31 pgs.

"U.S. Appl. No. 11/238,921, Response filed Jun. 23, 2009 to Non Final Office Action mailed Oct. 30, 2008", 32 pgs.

"U.S. Appl. No. 11/239,546, Advisory Action mailed Aug. 3, 2009", 3 pgs.

"U.S. Appl. No. 11/239,546, Non Final Office Action mailed Jun. 2, 2009", 17 pgs.

"U.S. Appl. No. 11/239,546, Non Final Office Action mailed Dec. 18, 2008", 10 pgs.

"U.S. Appl. No. 11/239,546, Response filed Feb. 27, 2009 to Non Final Office Action mailed Dec. 18, 2008", 5 pgs.

"U.S. Appl. No. 11/239,546, Response filed Jul. 20, 2009 to Final Office Action mailed May 19, 2009", 9 pgs.

"U.S. Appl. No. 11/322,567, Non Final Office Action mailed Dec. 31, 2007", 12 pgs.

"The J2EE Tutorial: Web Application Archives", Sun.com, sun.com/j2ee/tutorial/1-3-fcs/doc/WCC3.html, 1-4.

Abdel-Aziz, A.A., et al., "Mapping XML DTDs to Relational Schemas", *IEEE*, (2005), 1-4.

Amer-Yahia, S., et al., "A Web-Services Architecture for Efficient XML Data Exchange", *IEEE*, (2004), 1-12.

Banerji, A., et al., "Web Services Conversation Language (WSCL) 1.0", *W3C Note, World Wide Web Consortium*, URL http://www.w3.org/TR/wscl10/, (Mar. 2002).

Bussler, Christopher, et al., "A conceptual architecture for semantic web enabled services", *Dieter Fensel, Alexander Maedche, ACM SIGMOD Record*, v. 31, n. 4, (Dec. 2002), 6 pgs.

Dustdar, Schahram, et al., "A View Based Analysis on Web Service Registries", *Martin Treiber, Ditributed and Parallel Databases*, v. 18, n.2, (Sep. 2005), 147-171.

Ege, R. K., "Object-Oriented Database Access Via Reflection", *IEEE*, (1999), 36-41.

Huhns, Michael N., et al., "Service-Oriented Computing: Key Concepts and Principles", *IEEE Internet Computing, Munindar P. Singh*, v.9, n.1, (Jan. 2005), 75-81.

Hull, Richard, et al., "Tools for Composite Web Services: A Short Overview", *Jianwen Su, ACM SIGMOD Record*, v. 34, No. 2, (Jun. 2005), 10 pgs.

Shepherd, George, et al., "Programming with Microsoft Visual C++. Net", *Microsoft Press Sixth Edition*, (2003), 391-397, 771, 806-807, 820-826.

Thomas-Kerr, J., et al., "Bitstream Binding Language – Mapping XML Multimedia Containers into Streams", *IEEE*, (2005), 1-4.

"U.S. Appl. No. 11/238,244, Response filed Mar. 11, 2010 to Non Final Office Action mailed Dec. 17, 2009", 12 pgs.

"U.S. Appl. No. 11/238,912, Pre-Appeal Brief Request mailed Mar. 18, 2010", 5 pgs.

"U.S. Appl. No. 12/629,819, Preliminary Amendment filed Jan. 14, 2010", 8 pgs.

"U.S. Appl. No. 11/238,244, Final Office Action mailed Jun. 11, 2010", 25 pgs.

"U.S. Appl. No. 11/238,244, Non Final Office Action mailed Nov. 24, 2010", 36 pgs.

"U.S. Appl. No. 11/238,244, Response filed Feb. 9, 2011 to Non Final Office Action mailed Nov. 24, 2010", 16 pgs.

"U.S. Appl. No. 11/238,244, Final Office Action mailed May 5, 2011", 27 pgs.

"U.S. Appl. No. 12/628,819, Non Final Office Action mailed May 16, 2011", 8 pgs.

"U.S. Appl. No. 12/629,819 , Response filed Aug. 1, 2011 to Non Final Office Action mailed May 16, 2011", 9 pgs.

\* cited by examiner

METHOD AND SYSTEM FOR GENERATING A WEB SERVICES META MODEL ON THE JAVA STACK

TECHNICAL FIELD

Embodiments of the invention generally relate to the field of web services and, more particularly, to a system and method for generating a common meta model on a stack or JAVA stack.

BACKGROUND

Efforts are being made to more easily conduct business in a web-based environment. "Web Services" is loosely understood to mean the ability to discover and conduct business in a web-based environment. For example, a user (e.g., a web-based application or person with a web browser) may: 1) search through an online registry of businesses and/or services; 2) find a listing in the registry for web based access to a service that that the user desires to have performed; and then, 3) engage in a web based business relationship with the service application including the passing of relevant information (e.g., pricing, terms, and conditions) over the network. In other words, web services generally refer to offerings of services by one application to another via the World Wide Web.

Given the nature and use of web services and the rapid increase in their demand, interoperability of web services across clients and servers is becoming increasingly important and cumbersome. Some attempts have been made to achieve interoperability across a wide range of platforms and runtimes. For example, using open standards like eXtensible Markup Language (XML), Simple Object Access Protocol (SOAP), Web Services Description Language (WSDL), and Universal Description, Discovery, and Integration (UDDI), some interoperability has been achieved.

FIG. 1 illustrates a prior art web services platform 100. The platform 100 shows various XML-related standards 102-110 that are used in connection with web services to attempt interoperability. The illustrated standards include XML Namespaces 102, similar to JAVA package names, to provide syntax for data representation in portable format. SOAP 104 refers to a standard packaging format for transmitting XML data between applications over a network. XML schema 106 refers to the World Wide Web Consortium (W3C) schema specification for XML documents. WSDL 108 refers to the standard used for describing the structure of XML data that is exchanged between systems using SOAP 104. Finally, UDDI 110 refers to a standard SOAP-based interface for web services registry and defines a set of web services operations and methods that are used to store and search information regarding web services applications.

However, the open standards are not evolving fast enough to keep up with the increasing demand for web services and needs of additional flexibility and control on the client-side. One of the problems today is the convoluted relationships and mappings between relevant standards. Neither the interoperability nor the client-side flexibility are sufficiently achieved because of the conventional separation of standards, models, and entities for web services (WS) and web services client (WSC). FIG. 2 illustrates a prior art web services model 200. The illustrated web services model 200 includes Web service definition 204, which includes the description of design-time configuration of a web service. Web service configurations 206 refer to the description of the run-time configurations of a web service. The web services model 200 further includes a virtual interface 202. A virtual interface 202 refers to an abstract interface.

Referring now to FIG. 3, it illustrates a prior art web services client model 300. In the illustrated web services client model 300, schema to JAVA (STJ) mappings 302 contain serializer classes and deserializer classes of the XML Schema Definition (XSD) Types. However, the conventional STJ mappings 302 do not contain any field or operation-specific mappings. The conventional model 300 further includes logical ports 304 that are limited to containing merely runtime (RT) relevant configurations and do not contain design-time (DT) configurations. Finally, the illustrated WSDL 306 contains a parsed WSDL structure.

Although the conventional models 200, 300 provide some flexibility, further improvements are needed to achieve interoperability. For example, the conventional model 200 provides provider-oriented inside-out approach for web services, but it does not support consumer-based outside-in approach for web services, which is becoming increasingly important. The conventional models 200, 300 do not provide similar modeling approach for developing web services and web services client which leads to usability deficiencies.

SUMMARY

A method and system are provided for creating a common model. In one embodiment, a web services model and a web service client model are identified. Various components of the web services and web services client models are unified to create a common model.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1:
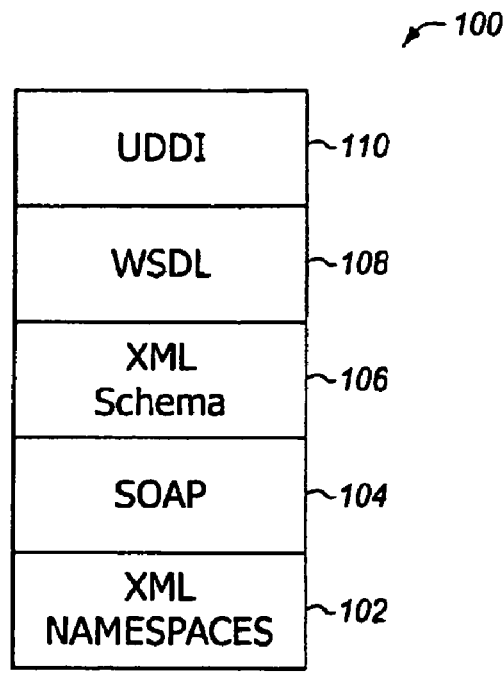
FIG. 1 illustrates a prior art web services platform.
Figure 2:
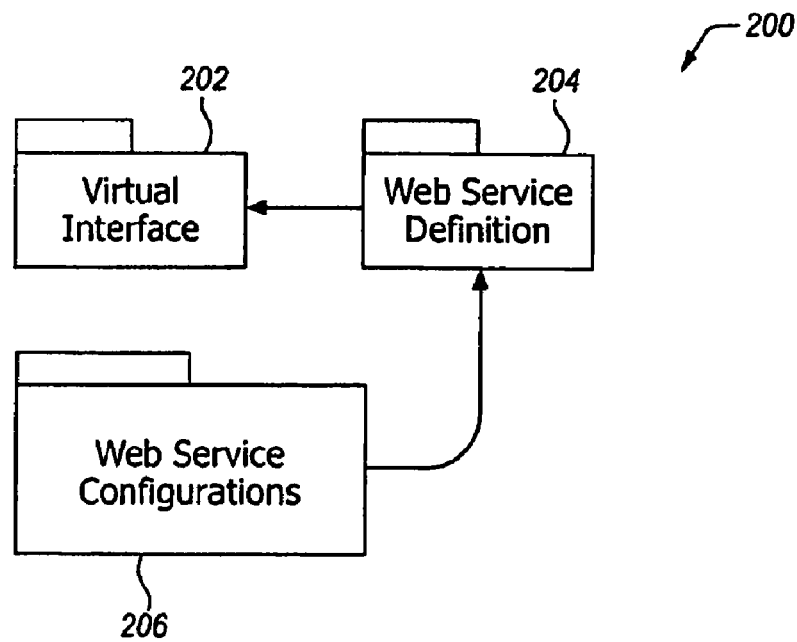
FIG. 2 illustrates a prior art web services model.
Figure 3:
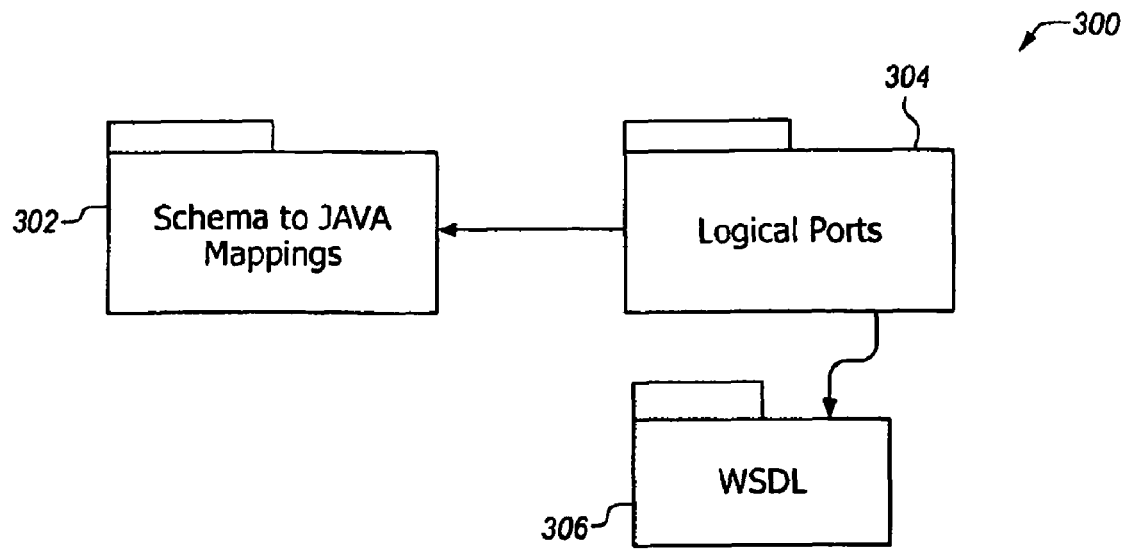
FIG. 3 illustrates a prior art web services client model.

Described below is a system and method for generating a common web services/web services client meta model.

Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), Digital Video Disk ROM (DVD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 4:
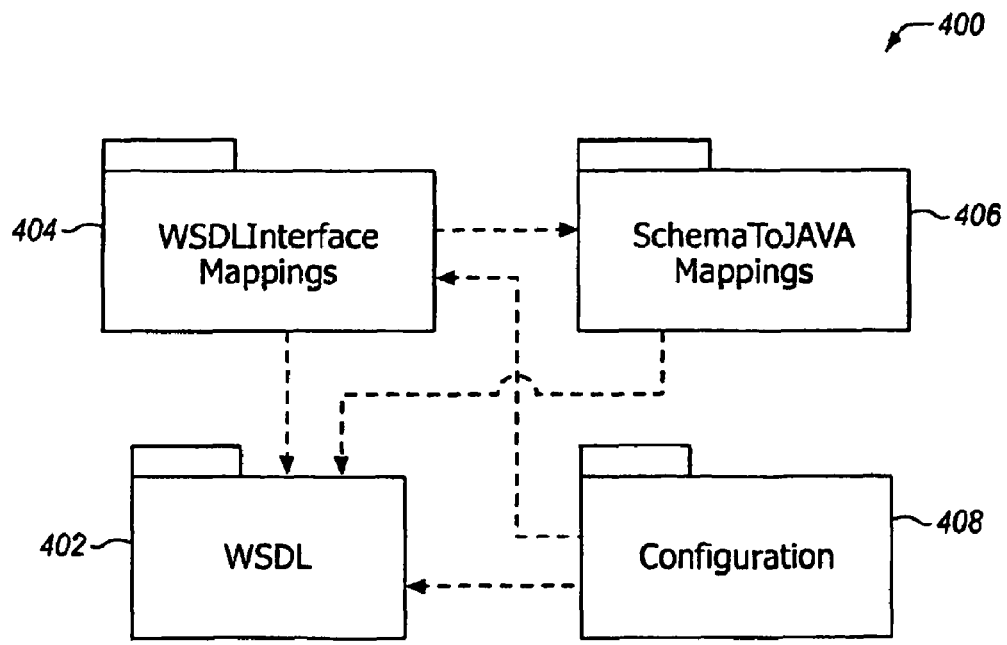
FIG. 4 illustrates an embodiment of a common meta model for web services and web services client.

FIG. 4 illustrates an embodiment of a common meta model 400 for web services and web services client. In the illustrated embodiment, a common web services meta model 400 is generated by combining various models 402-408 into a single common model (common model) 400. For example, the common model 400 includes a WSDL model 402, which refers to a model for describing the WSDL structure of the web services that are developed within an application, and/or WSDL files that are used to generate WS client proxies. The WSDL model 402 may also contain WSDL relevant extensions. The WSDL interface mappings (WSDL IM) model 404 refers to a model for describing mappings between a service interface such as the JAVA Service Endpoint (JSE) Interface (e.g., generated proxy service interface) and its WSDL representation, such as the names of the method or JAVA method and WSDL operation representing the method, default values of parameters, etc.

The illustrated Schema to JAVA mappings model 406 is used for describing mappings between XSD types and JAVA classes representing these types, such as the names of the fields. The configuration model 408 includes the design-time and runtime configuration of web services and web services client. The configuration model 408 logically references the WSDL model 402 and the WSDL IM model 404, which, in turn, references the STJ mappings model 406.

As illustrated, in one embodiment, a common model 400 is provided for WS and WSC frameworks to perform development, deployment and configuration of applications with relative ease. WS and WSC frameworks may reside on a JAVA 2 Enterprise Edition (J2EE) engine. In one embodiment, the common model 400 is migrated to the J2EE engine to run and use the WS/WSC proxy on the J2EE engine to provide a common model for WS and WSC frameworks. Such migration can be performed using various migration controllers and interfaces that are used for application development. In one embodiment, the common configuration is achieved by having a common configuration entity in the configuration model 408. Common design utilities are provided using a common interface mapping model 404 and a common schema to JAVA mapping model 406, while common deployment entities are provided with insignificant differences between client and server.

In one embodiment, common models 402-408 are managed by a common framework at the J2EE engine. The common model 400 is created by, first, identifying those elements, features, and components (components or properties) that are common to both web services model and web services client model. Once such common components are identified, they are then extracted and put together to create a common WS model. It is contemplated that those components that are necessary and/or preferred are used to create the common framework, while those components that are not regarded as necessary and/or preferred may not be used. Further, the use of such common components helps support the deployment of web services and web services client in a common way. For example, SAP administrative tools model can be converted in light of the common framework to separate the WS tools in the SAP Administrative tools from the J2EE engine because of the different requirements associated with the SAP Administrative tools and the J2EE engine. Examples of administrative tools include various Integrated Development Environment (IDE) tools (e.g., IDE wizard and IDE views) and other SAP-based IDE and administrative tools, such as SAP NetWeaver Developer Studio, SAP Visual Administrator, and SAP NetWeaver Administrator. Further, SAP's IDE can be based on the Eclipse IDE and may contain additional SAP developed plugins.

In the illustrated embodiment, the common model 400 combines the requirements from both the provider and consumer scenarios and is suitable to be used by both the service and client platforms. This is performed such that the common elements of functionality are adopted, while the uncommon elements work side-by-side not only without interfering with each other, but by complementing each other in the common model 400. In one embodiment, common models 402-408 are generated and employed and further, they are directly mapped in a common model 400 via any number of programming languages that are right for the time (e.g., C, C++, C#, JAVA, and ABAP). Further, a generator, such as a proxy generator or a code generator, modules, interfaces, and components are employed to form common models 402-408, generate WSDL model, form direct mapping between models 402-408 and between web services interfaces and JAVA interfaces.

The common model 400 eliminates the need for the conventional virtual interface for storing the data (e.g., description of the interface and its types). In one embodiment, web services interface data is separate between the WSDL model 402 and the two mapping models 404, 406. Using this technique, SOAP extensions are not longer necessary as the need for VI to WSDL conversion is eliminated. Using the common model 400, web interfaces are described in the WSDL model 402 as opposed to a virtual interface. Further, the interface mapping information is used to describe the mapping of web interfaces to JAVA interfaces (e.g., JAVA SEI). Then, multiple design time configurations can be attached to a single interface as an alternative. In one embodiment, the common model 400 is on the JAVA stack. The JAVA stack may include a JAVA stack having JAVA stack traces that refer to threads and/or monitors in a JAVA virtual machine at a J2EE engine.

Furthermore, the web services definition, which can be used to describe an alternative design-time configuration, is made part of the design-time part of the configuration model 408. This helps eliminate the need for generating several portTypes based on the web services definition, which would otherwise be necessary because the configuration would have to be expressed in the form of WSDL extensions. In one embodiment, a WS-policy standard is used to express configuration of web services and consequently, several alternative configurations can be expressed using one WSDL portType. A WS-policy standard can be dynamically created in which various parameters can be defined as necessary or desired. Further, a client proxy generated out of such WSDL may contain a single service endpoint interface (SEI), which has a superior use for the application developer using it as proxy. An SEI can be used to specify methods of the JAVA class that are to be exposed as web services operations, which are included and published in the WSDL model 402 as the portType that a client application uses to invoke web services.

In one embodiment, the STJ mappings model 406 contains not only serializer and deserializer classes, but also other field and operation-specific mappings information. Using the STJ mappings model 406 having such information helps facilitate various kinds of mappings, such as names of getter/setter methods of a specific field, if an attribute is presented as a data member or with getters/setters, etc. Moreover, although the conventional logical ports are limited to containing only real-time configurations, the illustrated embodiment of the configuration model 408 contains and maintains not only real-time configuration information, but also contains and maintains design-time configuration information. Various mapping files and interfaces may be used to map the individual models 402-408 into the common model 400.

The illustrated WSDL model 402 includes a WSDL file that specifies the WSDL structure, including message formats, Internet protocols, and addresses, that a client may use to communicate with a particular web service. Using the basic structure of WSDL, a WSDL document includes an XML document that adheres to the WSDL XML schema. A WSDL document contains various components and elements (e.g., biding, import, message, operation, portType, service, and types) that are rooted in the root element (e.g., definitions element) of the WSDL document.

The binding element is used to assign portTypes and its operation elements to a particular protocol (e.g., SOAP) and encoding style. The import element is used to import WSDL definitions from other WSDL documents (such as those similar to an XML schema document import element). The message element describes the message's payload using XML schema built-in types, complex types, and/or elements defined in the WSDL document's type elements. The operation and portType elements describe web service's interface and define its methods and are similar to JAVA interfaces and their method declarations. The service element is used for assigning an Internet address to a particular binding. The type element uses the XML schema language to declare complex data types and elements that are used elsewhere in the WSDL document. The WSDL IM model 404 is used for describing the mappings between the JAVA SEI and its WSDL representation.

The STJ mappings model 406 contains a model for describing mappings between XSD types and JAVA classes representing a group of classes and interfaces in JAVA packages, such as a name which is either derived from the XML namespace URI, or specified by a binding customization of the XML namespace URI, a set of JAVA content interfaces representing the content models declared within the schema, and a set of JAVA element interfaces representing element declarations occurring within the schema. The configuration model 408 includes both the design-time and runtime configuration of web services and web services clients. The configuration model 408 may also include one or more description descriptors or files, such as XML configuration files, deployment descriptors, etc.

In one embodiment, the WSDL IM model 404 contains reference to and uses elements of interfaces with the WSDL model 402. The WSDL IM model 404 further contains reference to the STJ mappings model 406. The STJ mappings model 406, on the other hand, references to the WSDL model 402 and uses elements from the WSDL model 402. Examples of the elements that the STJ mappings model 406 uses include elements of XSD and/or type elements, such as complex type and simple type. The configuration model 408 contains reference to the WSDL model 402 and the WSDL IM model 404.

A virtual interface refers to an abstract interface and/or a type description system that is created based on a programming language interface (e.g., JAVA interface and ABAP methods). A virtual interface can be used to decouple the language-specific implementation from interface description. A web service refers to an interface of the web service as described by the WSDL file at the WSDL model 402, which describes web services methods and web services type systems, such as the XML messages transmitted upon the web services invocation. When the web service interface is generated via the virtual interface, it is done by having JAVA classes build the virtual interface to generate the WSDL file (web interface). This process of WSDL generation is carried in the engine by the WS runtime, while the virtual interface contains hints for WSDL generation details called SOAP extensions. A WSDL file provides proxy generator which generates JAVA classes (web services client proxy) and logical ports (that contain web services client configuration). Using the web services client proxy classes, application invoke the web services described by the WSDL file. Also, using logical ports, applications configure the web services client proxy.

In one embodiment, virtual interfaces and the virtual interface model are eliminated by having the web services development based on WSDL (web services interface) at the WSDL model 402 in an outside-in scenario. For example, on the server side, WSDL 402 provides proxy generator which generates default mappings that are then changed (e.g., updated as the desired by the developer or as necessitated) using an administrative/IDE tool, such as an SAP NetWeaver Administrator, SAP NetWeaver Developer Studio, IDE wizard, etc. This is then used by the proxy generator to generate JAVA beans with mapped JAVA methods and WSDL 402 and mappings and the configuration model 408. A developer can implement methods (logic) of the bean and thus, providing logic to the web services methods. Furthermore, the conventional inside-out scenario can be customized using administrative and/or IDE tools to be compatible with the new model 400. For example, in one embodiment, JAVA classes can created a virtual interface that generates default WSDL which proves a proxy generator which further generates default mappings. These default mappings (e.g., default JAVA mappings) are then changed or updated or customized to reflect the original JAVA interface for which the common WS model 400 can be used by using/reusing the outside-in deployment. On the client side, in one embodiment, WSDL at the WSDL model 402 provides a proxy generate which generates JAVA files and mappings and the configuration model 408. This mechanism provides having the same deployment entities for adapting various scenarios (e.g., inside-out and outside-in) and allows the common model 400 for development of such scenarios.

Figure 5A:
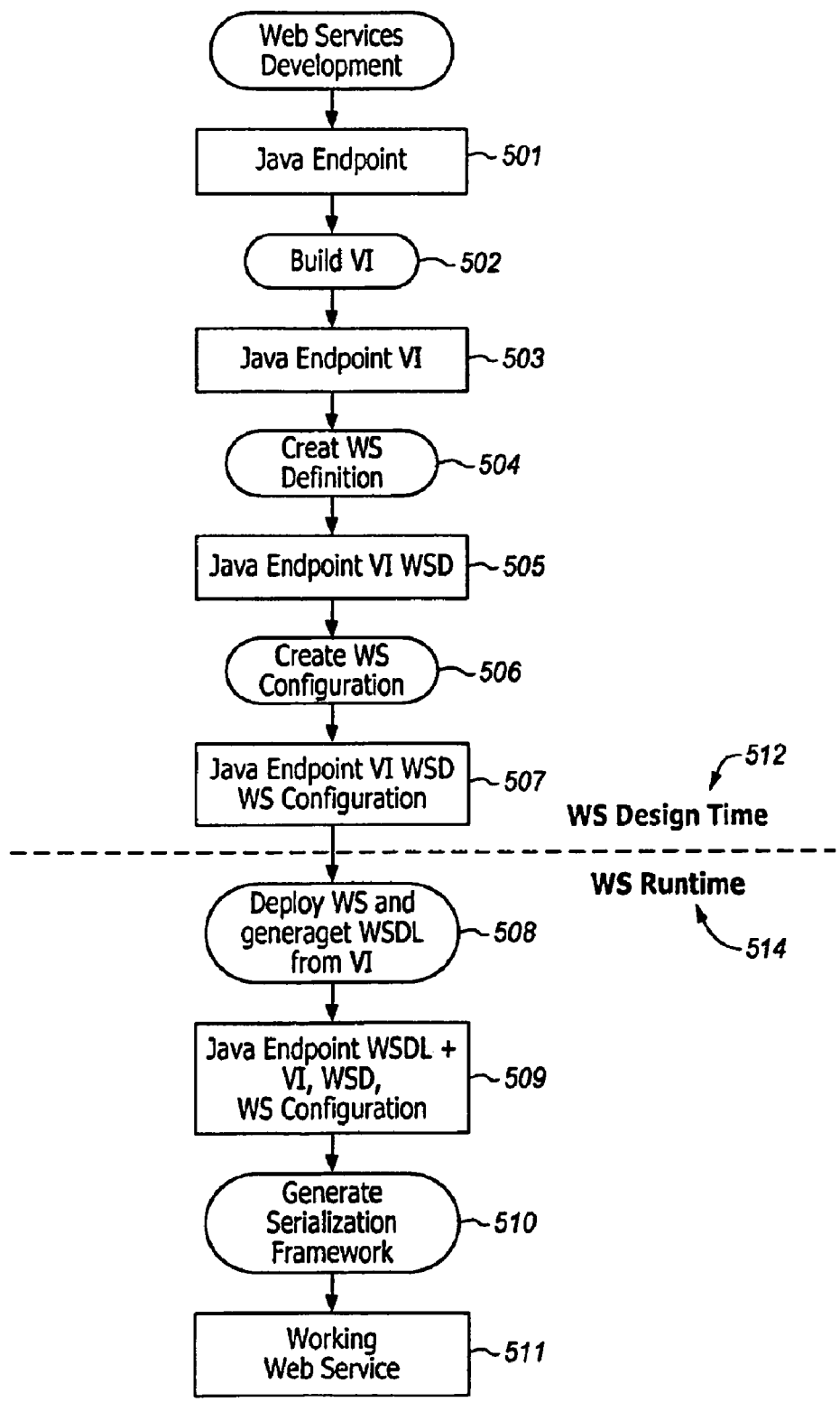
FIG. 5A illustrates an embodiment of a transaction sequence for web services development.

FIG. 5A illustrates an embodiment of a transaction sequence for web services development. To start web services development, at WS design time IDE 512, a JAVA endpoint is made available 501. Then, a virtual interface is built 502, transforming it into a JAVA endpoint VI 503. A WS definition is created 504, leading to JAVA endpoint VI and web services definition (WSD) 505. A WS configuration is created 506, which makes available a JAVA endpoint, VI, WSD, and web services configuration. At web services runtime 514, a web service is deployed and a WSDL is generated 508. Once the web services is deployed, JAVA endpoint, WSDL, VI, WSD, and web services configuration are available 509 and are used to generate a serialization framework 510, which leads to a working web service.

Figure 5B:
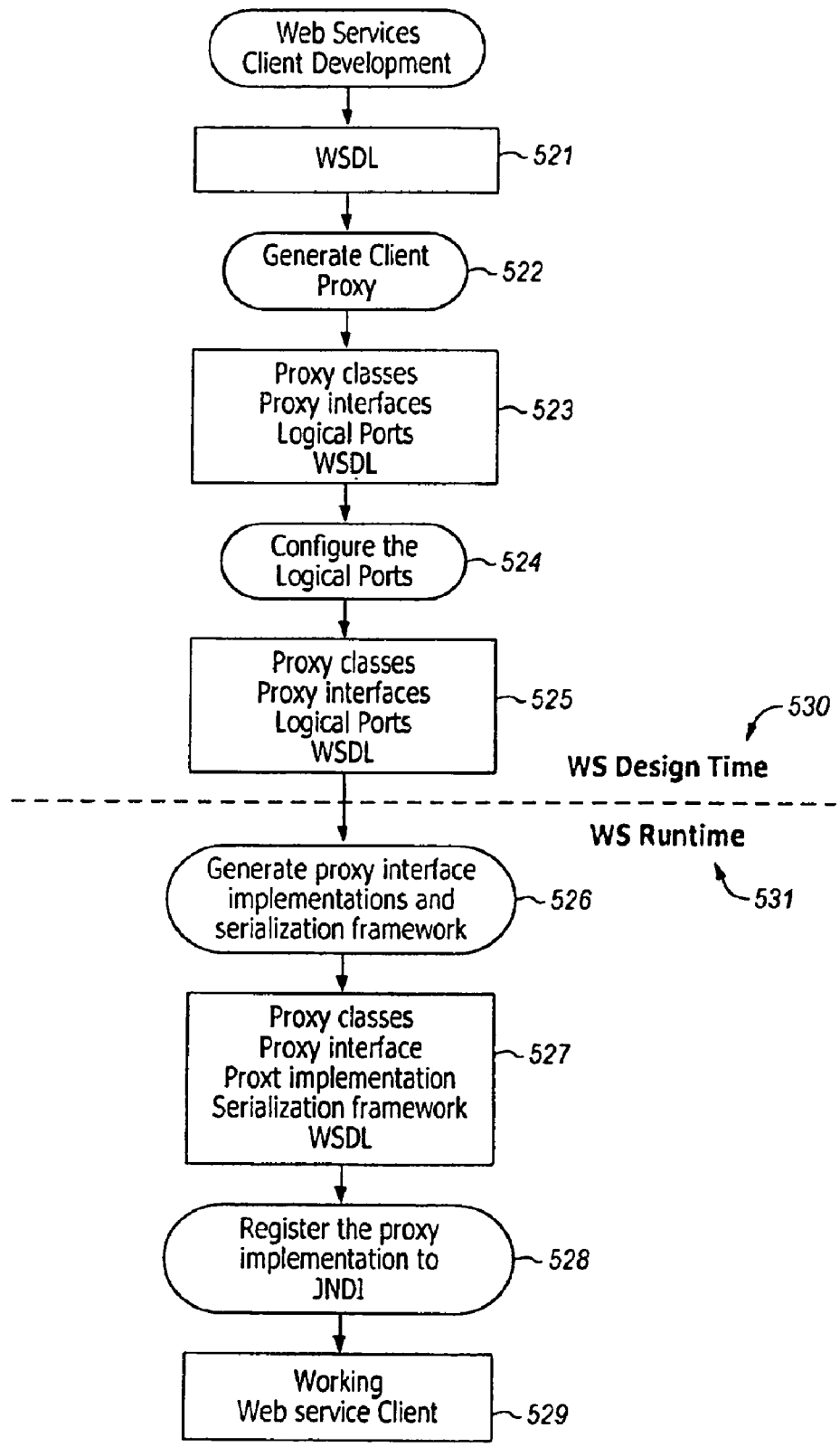
FIG. 5B illustrates an embodiment of a transaction sequence for web services client development.

FIG. 5B illustrates an embodiment of a transaction sequence for web services client development. To start web services client development, at WS design time IDE 530, web services client generation is started with a WSDL 521. The WSDL is generated as described elsewhere in this document. Using the WSDL, a client proxy is generated 522, which results in the availability of proxy classes, proxy interfaces, logical ports, and WSDL 523. Logical ports are then configured 524. Proxy classes, proxy interfaces, logical ports, and WSDL are now made available 525. At WS runtime 531, proxy interface implementations and serialization framework are generated 526, which leads to proxy classes, proxy interfaces, proxy implementations, serialization framework, and WSDL being available 527. Proxy implementation is then registered with JAVA Naming and Directory Interface (JNDI) 528. A working web services client is made available 529.

Figure 5C:
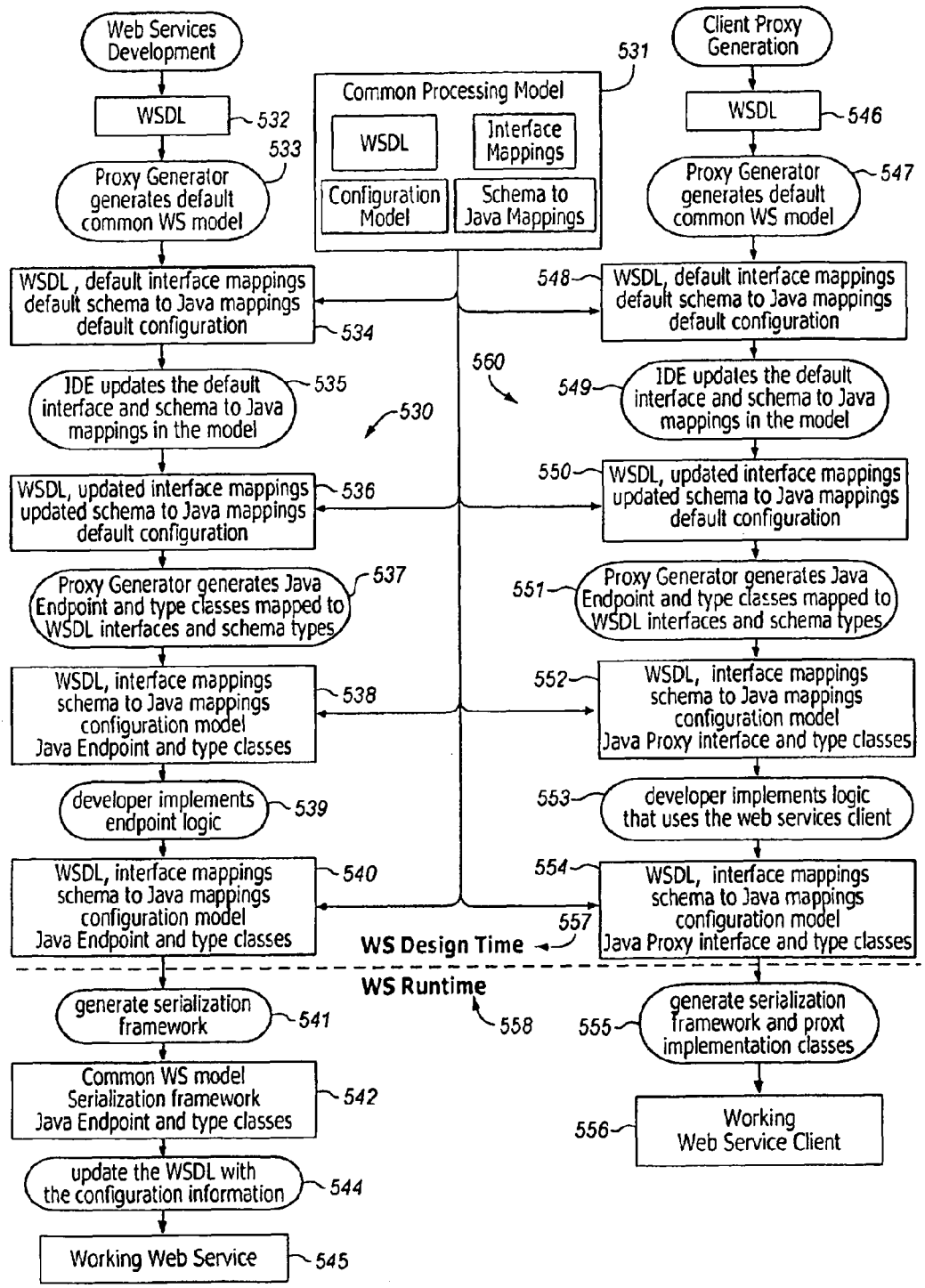
FIG. 5C illustrates an embodiment of transaction sequence for web services development and client proxy generation via a common model.

FIG. 5C illustrates an embodiment of transaction sequence for web services development and client proxy generation via a common model. A common model 531 includes various common models including a WSDL model, a WSDL interface mappings model in communication with the WSDL model and a schema to JAVA mappings model. The schema to JAVA mappings model is further in communication with the WSDL model. Finally, a configuration model is in communication with the WSDL interface model and the WSDL model. At web services design time IDE 557, outside-in web services development starts with the WSDL model 532. Similarly, at web services design time IDE 557, client proxy generation 560 starts with the WSDL model 546. In either case, a generator (e.g., proxy generator) generates default common web services model 533, 547. WSDL, default interface mappings, default schema to JAVA mappings, and default configuration are now available 534, 548.

In one embodiment, an administrative tool updates the default interface and schema to JAVA mappings 535, 549 their respective model in the common model 531. With such update, WSDL, updated interface mappings, updated schema to JAVA mappings, and default configuration model are provided 536, 550. At web service development 530, the proxy generator generates a JAVA endpoint and type classed mapped to WSDL interfaces and schema types 537, while at client proxy generation 560, the proxy generator generates a JAVA proxy interface and type classes mapped to WSDL interfaces and schema types 551.

Continuing with WS development 530 at WS design time 557, WSDL, interface mappings, schema to JAVA mappings, the configuration model, and endpoint and type classes are made available 538. The endpoint logic is then implemented 539. WSDL, interface mappings, schema to JAVA mappings, the configuration model, and JAVA endpoint and type classes are provided 540. At web services runtime 558, WS development 530 continues with the generation of a serialization framework 541. A common WS model, the serialization framework, and JAVA endpoint and type classes are provided 542. WSDL is then updated with the configuration information 544. A working web service is then provided 545.

Now continuing with client proxy generation 560 at WS design time 557, WSDL, interface mappings, schema to JAVA mappings, the configuration model, and JAVA proxy interface and type classes are made available 552. The logic that uses the web service client is implemented 553. WSDL, interface mappings, schema to JAVA mappings, the configuration model, and JAVA proxy interface and type classes are provided 554. At WS runtime 558, client proxy generation 560 continues with the generation of a serialization framework and proxy implementation classes 555. A working web services client is then provided 556.

Figure 5D:
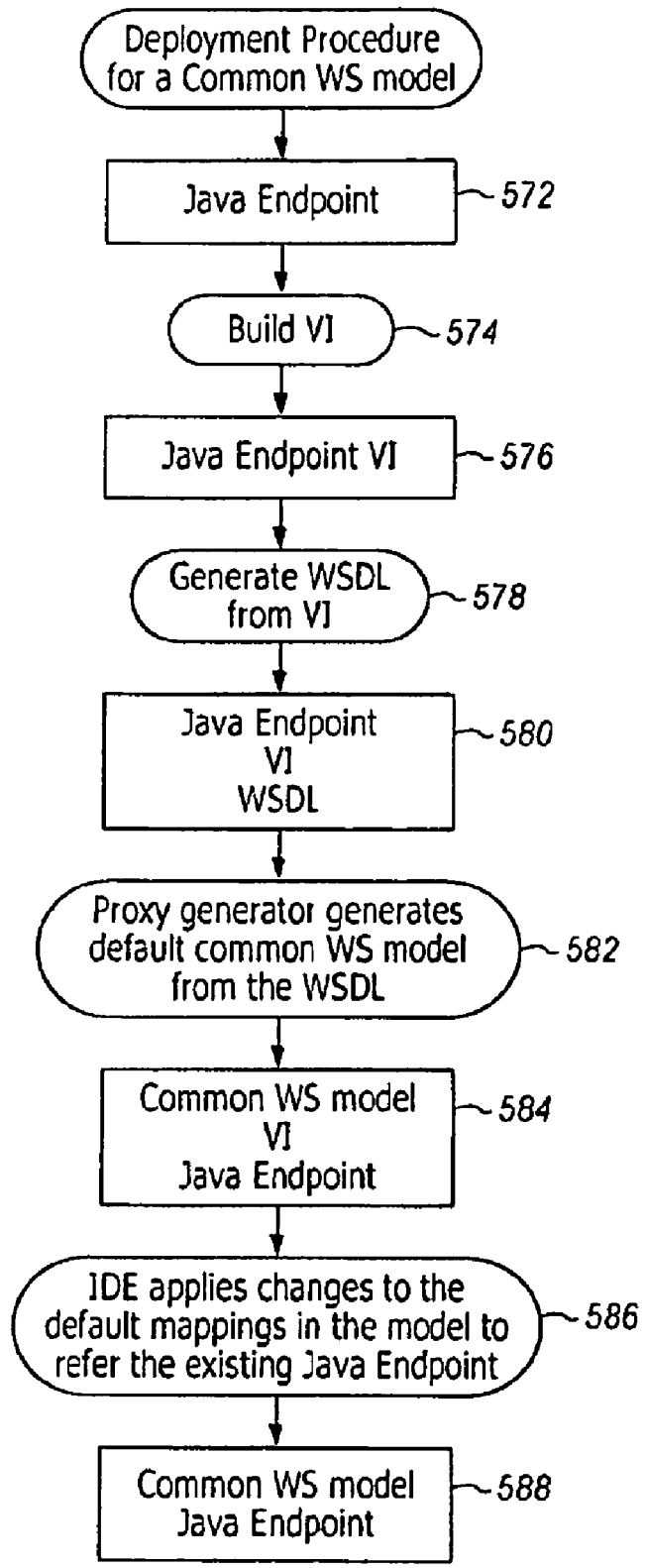
FIG. 5D illustrates an embodiment of a transactional sequence for the deployment of a common model.
Figure 6A:
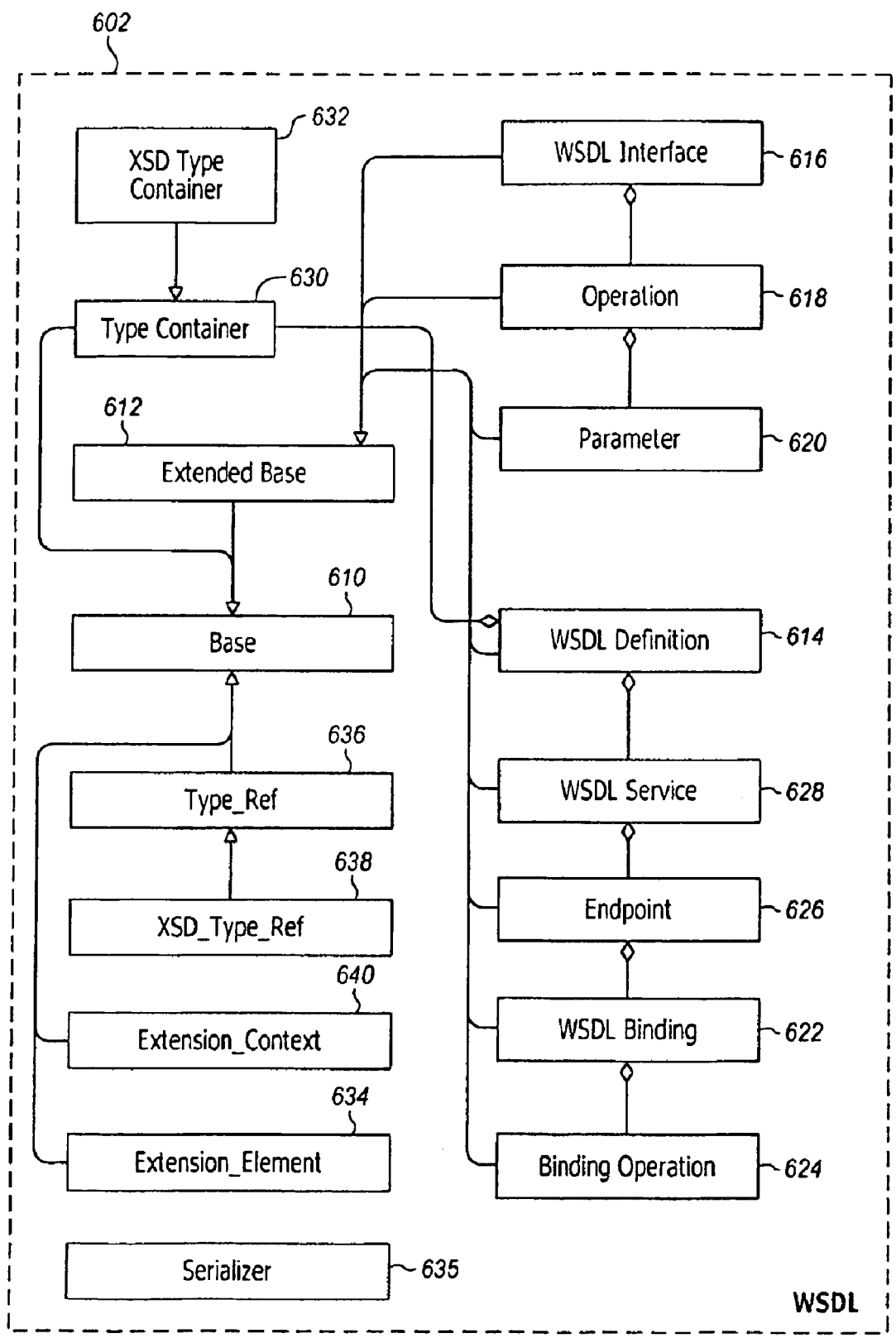
FIGS. 6A-6D illustrate internal architecture of directly mapped models of a common model.
Figure 6B:
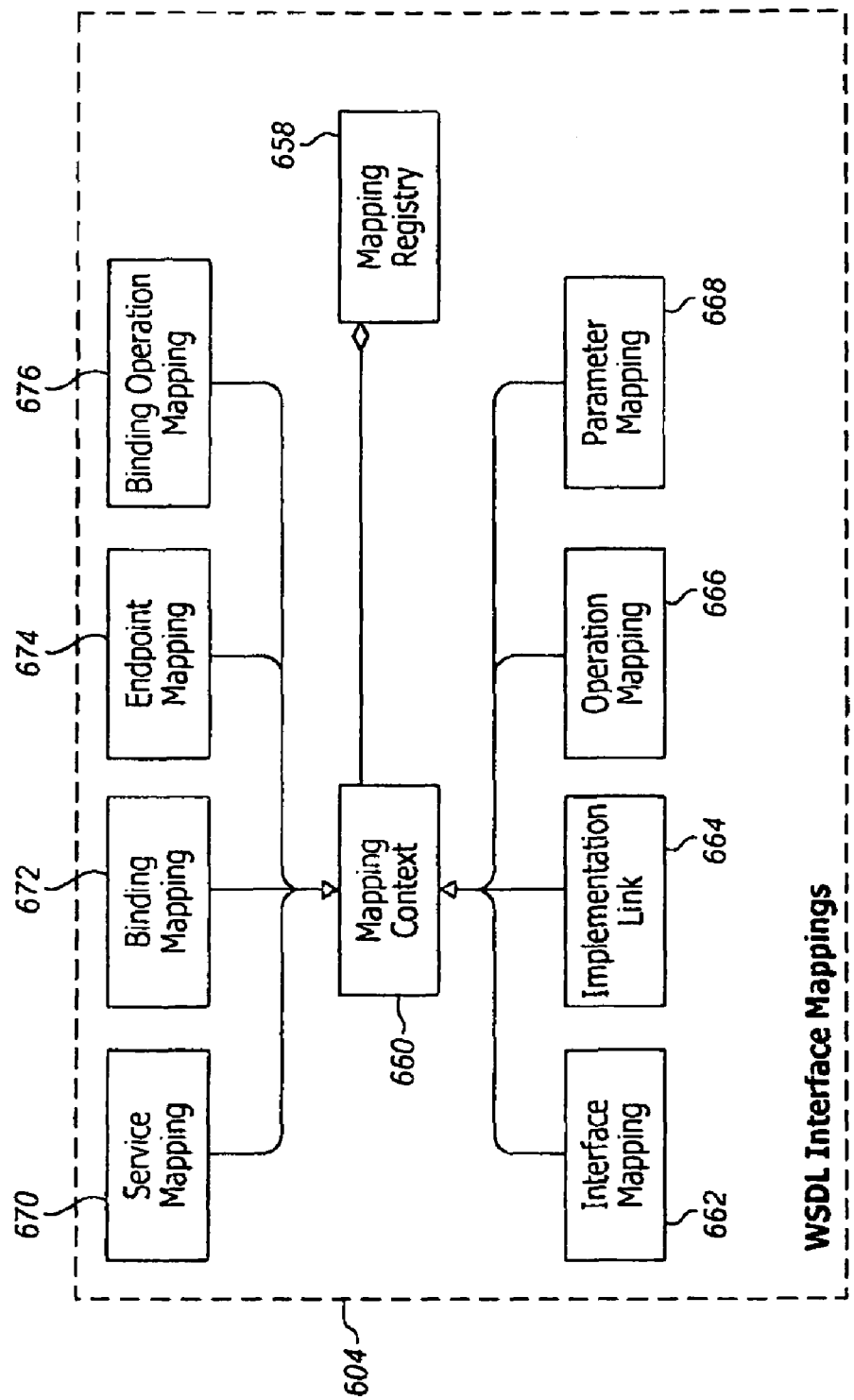
Figure 6C:
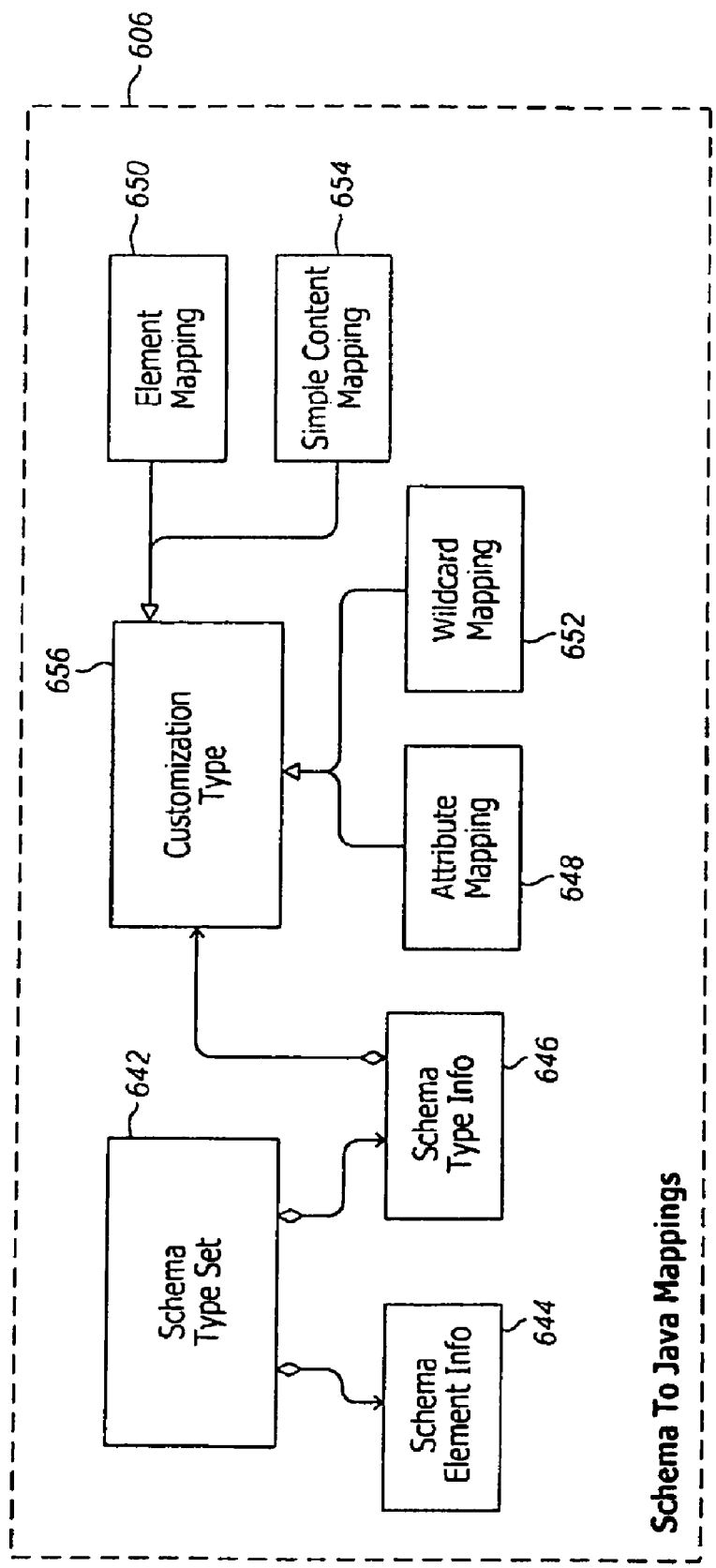
Figure 6D:
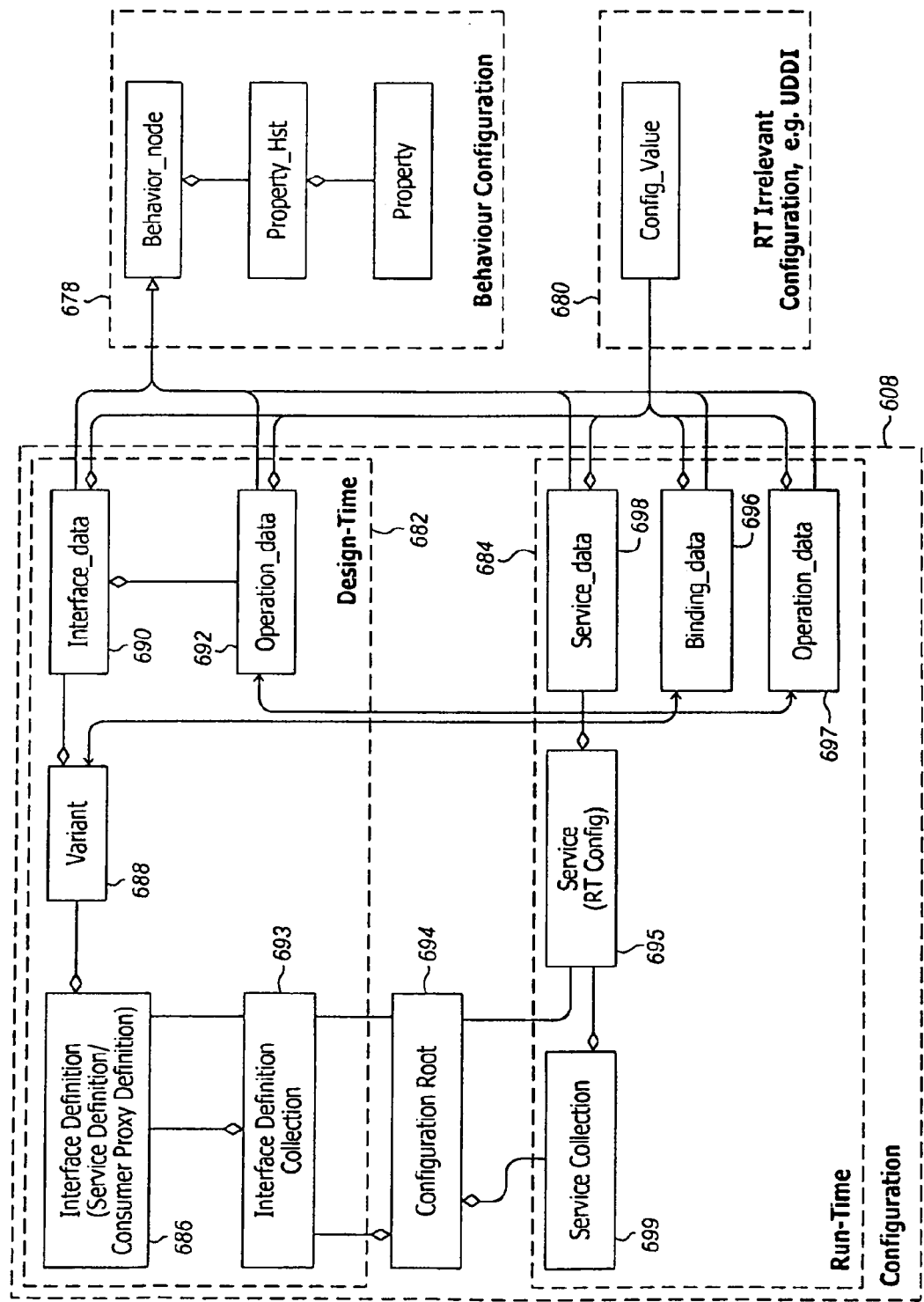

FIG. 5D illustrates an embodiment of a transactional sequence for the deployment of a common model. The deployment procedure for a common web services model starts with inside-out support for web services with the available JAVA endpoint 572. A virtual interface is then built 574 and a JAVA endpoint VI is made available 576. A WSDL model is then generated via the virtual interface 578. Available now are the JAVA endpoint, VI, and WSDL 580. A proxy generator is then used to generate default common WS model from the WSDL 582. A common WS model, VI, and JAVA endpoint are provided 584. Administrative/IDE tools are used to apply changes to the default mappings in the common model to refer to the existing JAVA endpoint 586. The common WS model with a JAVA endpoint is provided 588.

FIGS. 6A-6D illustrate internal architecture of directly mapped models 602-608 of a common model. In the illustrated embodiment, the common model primarily comprises a WSDL model 602 (FIG. 6A), a WSDL IM model 604 (FIG. 6B), a STJ mappings model 606 (FIG. 6C), and a configuration model 608 (FIG. 6D) as also illustrated with reference to FIG. 4. In one embodiment, there may not be a specific serialization of the WSDL model 602 as the API can be loaded out of a WSDL file and further, based on the API, a WSDL file can be generated. However, the API may not exactly follow the WSDL structure for it is made to support and be compatible with various versions of WSDL. Also, the API is used to hide any information about the type of WSDL that is being used or is going to be generated.

The illustrated WSDL model 602 includes various classes 610-640. The classes 610-640 may include base 610, which refers to a base class that is extended by all other classes and provides methods for traversing the WSDL tree structure. Extended base 612 includes a class that extends base 610 and provides methods for adding and getting WSDL extension elements. WSDL definition 614 refers to a class for representing the WSDL definitions element in a WSDL file and is the root element that contains other elements. WSDL interface 616 includes a class that represents the WSDL PortType element and specifies the name of the endpoint interface for the users of the service. Further, the real JAVA name is kept in the WSDL IM model 604, so that the WS framework can find and initialize the correct endpoint that is being requested.

The WSDL model 602 further includes operation 618, which refers to a class that represents the operation on the portType level and specifies simply the WSDL-related information, while the JAVA-related information is part of the WSDL IM model 604. Parameter 620 includes a class that represents a parameter of an operation. Based on the style of WSDL that is going to be generated, the parameter 620 can be located on different places in the WSDL document. In a document style WSDL, a wrapper type is generated and made part of the XML schema.

Further, WSDL binding 622 includes a class that provides abstraction of the different bindings that are part of WSDL and contain common binding features. Binding operation 624 refers to a class that represents a WSDL operation on the binding level, i.e., it contains data that is relevant to binding. Endpoint 626 contains a class that represents the endpoint that is accepting requests for a WS. WSDL service 628 is a class that represents the WSDL service element, and it further represents a collection of endpoints of a WS. Type container 630 is an abstract class to help support other type systems in addition to the XML schema. XSD type container 632 is an XML schema-based type container, which uses the XML schema API in order to express the schema types. Extension element 634 refers to a class that represents WSDL extension elements, such as elements that are not part of the WSDL standard itself (e.g., WS-Policy expressions as defined in the WS-Policy WSDL Attachment specification). The WSDL model 602 further includes serializer 635, type reference 636, XSD type reference 638, and extension context 640.

In one embodiment, the STJ mappings model 606 is used for storing internal data needed for the WS framework, including runtime, proxy generation, etc. Although the XSD types are defined in the XSD type container 632 (residing at the WSDL model 602), information about reference between XSD types and JAVA classes is stored elsewhere, such as at the STJ mappings model 606. Schema type set 642 refers to a placeholder for type mapping information, such as information about schema elements (at schema element info 644) and schema types (at schema type info 646). In addition, schema type set 642 contains internal information, such as which of JAVA classes suit as serializers and deserializers.

Furthermore, each schema type may contain mapping information (e.g., JAVA names) if a field is declared as public or private and access to it is available with getters/setters, etc. These mappings are stored in attribute mapping 648, element mapping 650, wild card mapping 652, and simple content mapping 654 depending on the appropriate XSD entity (e.g., attributes and elements). The STJ mappings model 606 further includes customization type 656 for storing attribute mapping, element mapping, and the like.

In one embodiment, the WSDL IM model 604 is used for storing internal data needed for the WS framework being employed. Unlike the STJ mappings model 606 which stores mapping relevant for types, the WSDL IM model 604 stores mapping on the interface level. These mappings are organized in a mapping registry 658 that is based on its WSDL entity. From the mapping registry 658, an appropriate mapping context 660 can be obtained. The mapping context class 660 refers to a generic class to provide access to mappings in the form of generic properties. Additional helper classes are also created and associated for providing type access to mappings. As illustrated, such helper classes include interface mapping 662, implementation link 664, operation mapping 666, parameter mapping 668, service mapping 670, binding mapping 672, endpoint mapping 674, and binding operation mapping 676.

The configuration model 608 is used to keep the entire configuration of web services and/or web services client. The configuration model 608 is divided into two logical parts of design-time 682 and run-time 684. For example, design-time 682 is used to define basic authentication requirements (e.g., username and/or password) needed to access a WS endpoint (e.g., the endpoint requiring authentication in order to work properly and securely) and/or strong authentication (e.g., X509 authentication certificate) for allowing additionally secure access to the endpoint. Run-time 684 is used to define how such DT configurations are met. Stated differently, basic and strong configurations (e.g., basic and strong authentication requirement configurations) are design-time configurations, while runtime configurations are to determine and/or define how such design-time configurations are achieved. For example, if basic authentication is set as DT configuration, the RT configuration could be username/password or authentication certificate, but if strong authentication is set as DT configuration, the RT configuration would require either an authentication certificate or both the username/password combination and an authentication certificate. DT configurations may be set by a developer of the application, while RT configurations may be set by a configurator. From the consumer point of view, DT configurations are initially loaded by the WS-Policies in the WSDL that is used in order to generate the proxy, but the developer can still modify DT configurations at a later point in time (e.g., in the NetWeaver Developer Studio). The illustrated configuration model 608 includes DT 682, RT 684, and other parts, such as behavior configuration 678 and RT irrelevant configuration 680.

Behavior configuration 678 contains behavior in the form of generic properties, in which each property includes its qualified name and value. The properties used within various WS frameworks (e.g., ABAP-based WS framework and JAVA-based WS framework) and their protocols (e.g., security protocols and reliable messaging protocols) are predefined and described in an external document. These properties describe the real-time configuration, such as authentication and authorization. RT irrelevant configuration 680 includes configuration that may not be needed for the WS runtime to work. At RT irrelevant configuration 680, information relating to UDDI publications is stored. For example, if one publishes a WS in UDDI, the key to the UDDI entities are stored at RT irrelevant configuration 680 so that the publication can be updated when needed.

Design-time 682 contains classes that store DT configurations. Such classes include interface definition 686 that is bound to one endpoint interface and can contain one or more variants 688. Variant 688 represents a single DT alternative configuration. Each alternative configuration is a valid configuration for accessing the WS endpoint and users may choose the one to use. The configuration itself is separated into interface level (that is relevant for all operations) and operation level (which represents an additional operation-specific configuration) that are stored in the interface data class 690 and the operation data class 692. Run-time 684 includes classes that store RT configurations. Based on one interface, one or more Services 695 may be created. Each service 695 may have one or more RT alternative configuration (e.g. basic authentication and strong authentication) and the user may choose the one to use depending on the data he possesses (e.g., userID/password or certificate). Each RT alternative is represented by the binding data class 696 for the interface level and the operation data class 697 for the operation level. Additionally, a service 695 may have configuration relevant for all services and valid for all alternatives in its service data 698.

Figure 7:
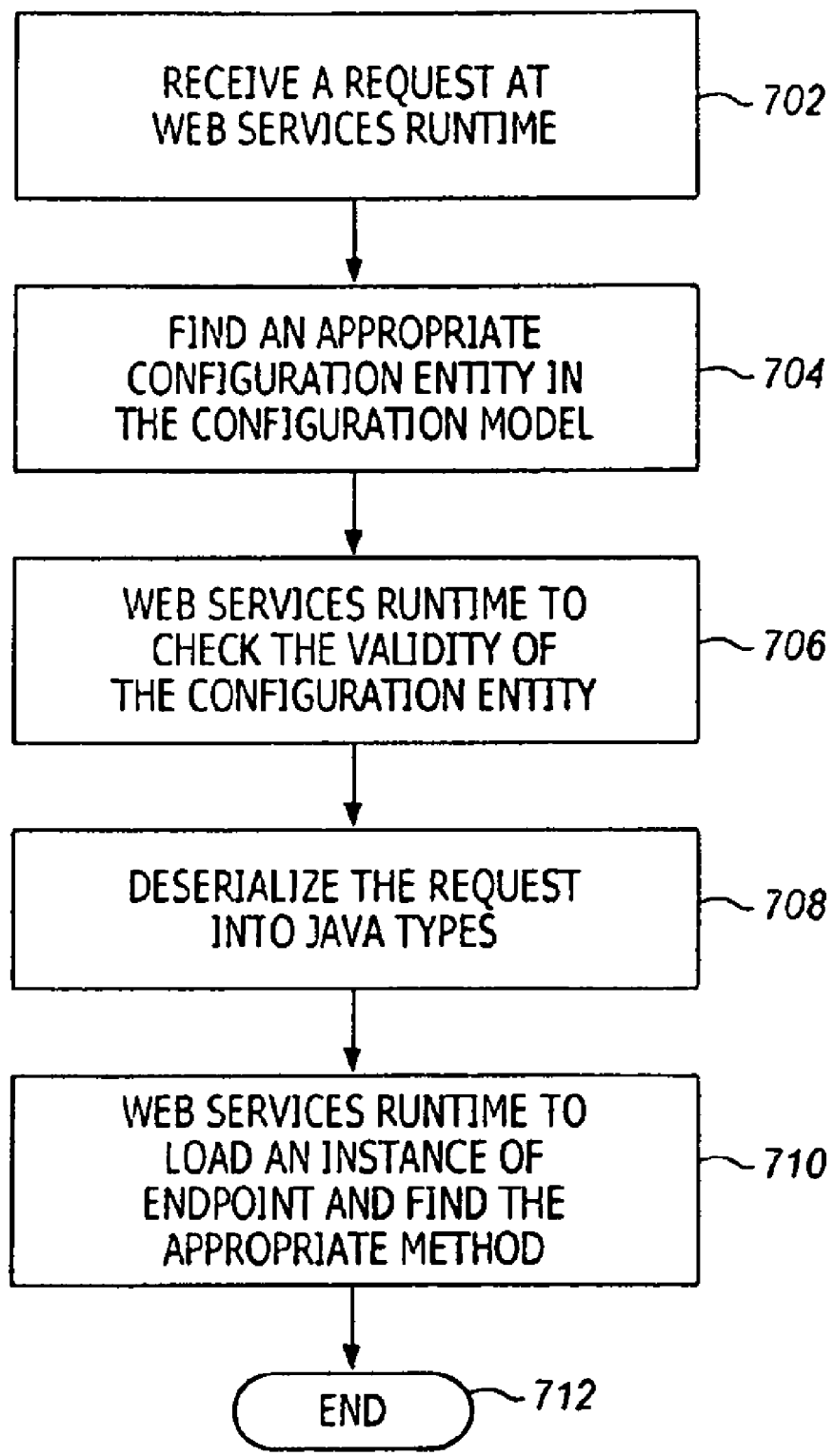
FIG. 7 illustrates an embodiment of a process for logical referencing within a common model.

FIG. 7 illustrates an embodiment of a process for logical referencing within a common model. In one embodiment, a request is received at WS Runtime at processing block 702. Once the request is received, based on the URL that was accessed, an appropriate configuration entity is found in the configuration model at processing block 704. This configuration entity points to a WSDL entity that describes how it is used with the appropriate binding (e.g., in SOAP) and describe the configuration that allows access to an appropriate method. At processing block 706, the WS runtime checks whether the configuration is fine, whether the request follows the binding described in the WSDL model, and also finds which operation needs to be invoked with what parameters. The WS runtime further helps facilitate deserialization of the request into the appropriate JAVA types using the STJ mappings model at processing block 708. Further, the WS runtime loads an instance of the endpoint and finds the appropriate method that is about to be invoked as described in the WSDL IM model at processing block 710. The process ends at termination block 712.

Figure 8:
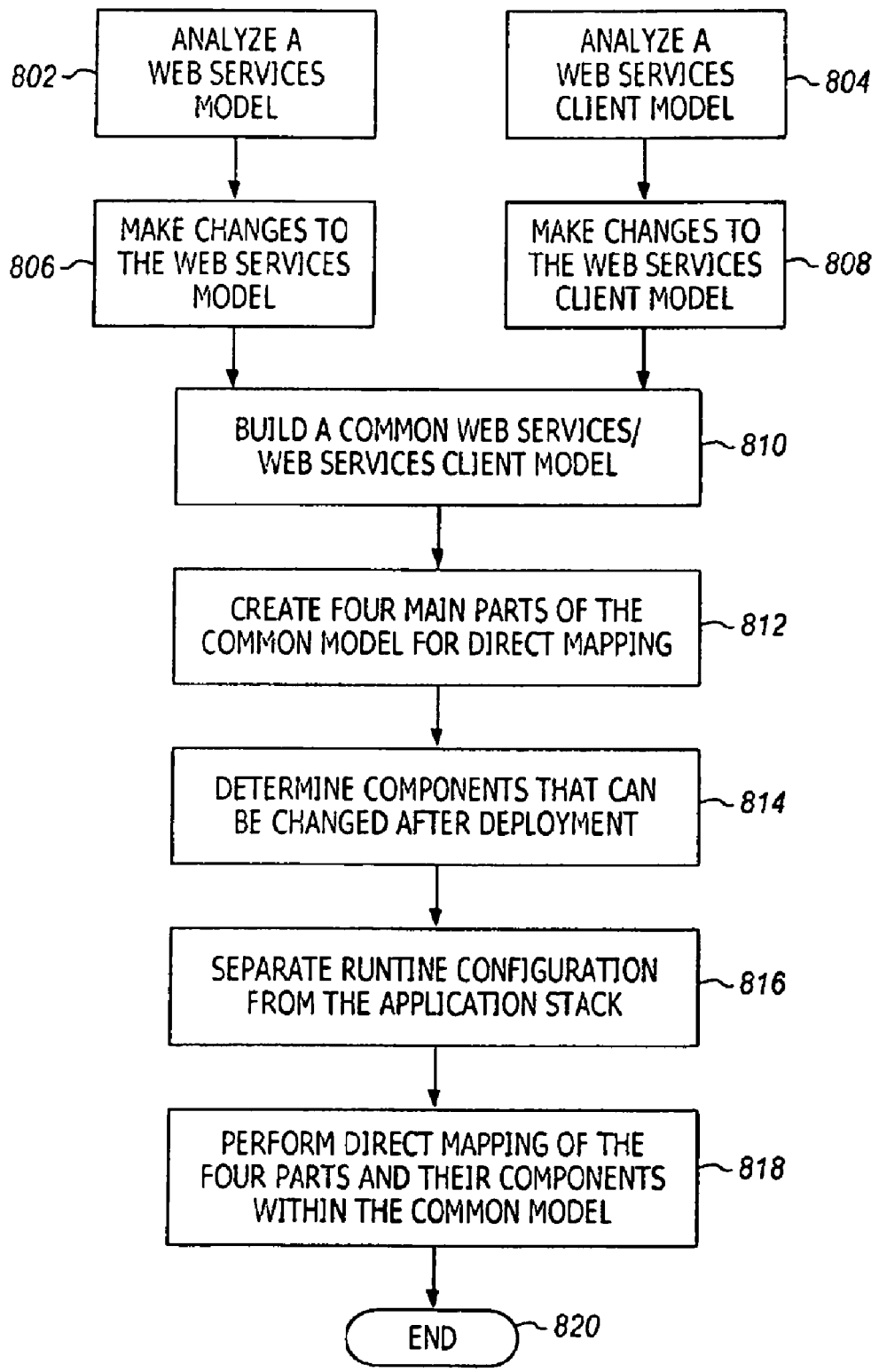
FIG. 8 illustrates an embodiment of a process for creating a common model.

FIG. 8 illustrates an embodiment of a process for creating a common model. In one embodiment, at processing blocks 802 and 804, separate web services and web services client models are analyzed to be integrated into a common WS/WS client model (common model). In analyzing the WS model, those components that are capable of supporting a new development framework for adopting the common model are considered. For example, the same model can be used between WS runtime on the engine and WS administrative tools and thus, the components are considered for both the WS runtime and WS administrative tools. Also, a suitable format may be used to adopt various descriptions in the administrative tools that are stored in special format so that they can be easily translated into different languages; while for WS runtime, standard property files are preferred.

The analysis of the WS model further includes considering using meta model framework as opposed to using XML parsing for easier integration with other plug-ins. Also, to generate a WSDL file that is supportive of the outside-in approach, a proxy generator is created and used (as opposed to using the conventional virtual interface). The proxy generator may be used in connection with a mapping module. Furthermore, in order to harmonize configuration tools and build a unified tool for configuration on the engine itself, the same format for storing the configurations is created, such as integrating the client configuration with the DT part and the RT part of the configuration that are stored at a WS definition file and the deployment descriptor, respectively.

At processing block 806, changes to the web services model are made. As a result of the analysis of the web services model, several changes to the web services model are made to help support new requirements for web services so that is adapted in the new common model. For example, in relation to the considerations described above, conversion controllers may be implemented using administrative/IDE tools such that the WS runtime meta model can be converted into the administrative/IDE meta model. The WS runtime is to provide a generator that loads the WS runtime meta model out of a WSDL file, so the data can be changed via administrative/IDE tools before serializing it into an XML file. Similarly, the WS runtime is to provide a unique way to set JAVA/WSDL/JXSD mappings. By changing the SOAP extensions definition, the SOAP extensions are made powerful enough to support the outside-in development approach. Further, the WS runtime is to provide a model that expresses each kind of WSDL version in an independent way such that the administrative/IDE tools do not affect the WSDL version. Also, a model is introduced for the WS runtime to help store both the DT configuration and the RT configuration for both the provider side and the consumer side.

With regard to analyzing the web services client model, various considerations are made and components are changed, deleted, or implemented as necessary and/or desired. For example, the way a user specifies WSDL to JAVA mappings (e.g., generated classes, methods) may not be changed. Also, it is determined that the XSD to JAVA mappings are more loaded than mappings on the WS side (e.g., SOAP extensions), but they are stored in a different format. Further, a consideration is given to employing a way to express DT configurations. At processing block 808, changes to the web service client model are made. For example, support for DT configurations is introduced, WSDL to JAVA mapping is provided, and various WSDL versions (e.g., WSDL 1.1, WSDL 2.0) are to be considered and consumed.

In one embodiment, once the web services and web services client models are analyzed and changes to them are introduced, a unified and common model for web services and web service client is built at processing block 810. Those components that are common and/or cannot be changed or deleted and/or are preferred, as discussed above, are kept and maintained. Various other components, however, can be changed deleted as necessitated. Further, several new components may also be added as necessitated and/or preferred. For example, a model for independently representing WSDL versions, a model for representing WSDL to JAVA mappings and XSD to JAVA mappings, a model for representing DT and RT configurations are maintained, but amended to work together in the common model that can be used for both the development and maintenance sides.

At processing block 812, various models are created in communication with each other to form direct mapping within the common model. The models include a configuration model, a WSDL model, a WSDL IM model, and a STJ mappings model, as discussed elsewhere in this document. The independent WSDL model is generated by, first, determining the WSDL main entities and then creating the WSDL model using such entities. Further, how the entities are loaded and/or stored in a WSDL file can be specified to avoid potential problems. Models for representing mappings, such as the WSDL IM model and the XSD mappings model, are also created. For example, XSD mappings can be much more complex than WSDL interface mappings, while the existing XSD mappings for the client side are type-oriented and thus, two models can be created. The model for representing configurations is also created. Since the part that describes the behavior of the subject nodes is known, the DT part and the RT part of the model are combined into one file with one XSD, but they can still be kept logically separated. Furthermore, SOAP extensions and their representations are defined in the new common mappings model. Further, the IDE runtime meta model is also defined (e.g., defining how to load the model out of a WSDL file and change the modified settings from the IDE meta model). The format in which different parts of the overall model are to be serialized is also defined.

Furthermore, the deployment descriptors for provider and consumer sides that point to the files of the different parts of the format are also defined.

At processing block 814, the components that can be changed after the RT configuration is deployed are determined. For example, the WSDL, mappings, and DT configurations are modified by the developer, while the RT configurations are modified by the configurator. RT configurations are then separated from the application itself at processing block 816. In one embodiment, shared configurations can be created for multiple interfaces (even from different applications). Due to having a unified configuration for both the provider side and the consumer side, a web services configuration tool can be created on the J2EE engine. On the other hand, for the purpose of mass configuration, a configuration template that contains RT configurations can be created and applied to any number of DT configurations that are deployed on the engine. RT configurations can be stored separately and/or globally at the WS container and assigned to DT configurations. This eliminates the need for performing configurations at the IDE to be stored in the application itself. At processing block 818, the direct mapping between the four parts and their components is created within the common model, which is not ready for use. At termination block 820, the process ends.

The architectures and methodologies discussed above may be implemented with various types of computing systems such as an application server that includes a J2EE server that supports Enterprise JAVA Bean (EJB) components and EJB containers (at the business layer) and/or Servlets and JAVA Server Pages (JSP) (at the presentation layer). Of course, other embodiments may be implemented in the context of various different software platforms including, by way of example, Microsoft®.NET, Windows®/NT, Microsoft Transaction Server (MTS), the ABAP platforms developed by SAP AG and comparable platforms.

Figure 9:
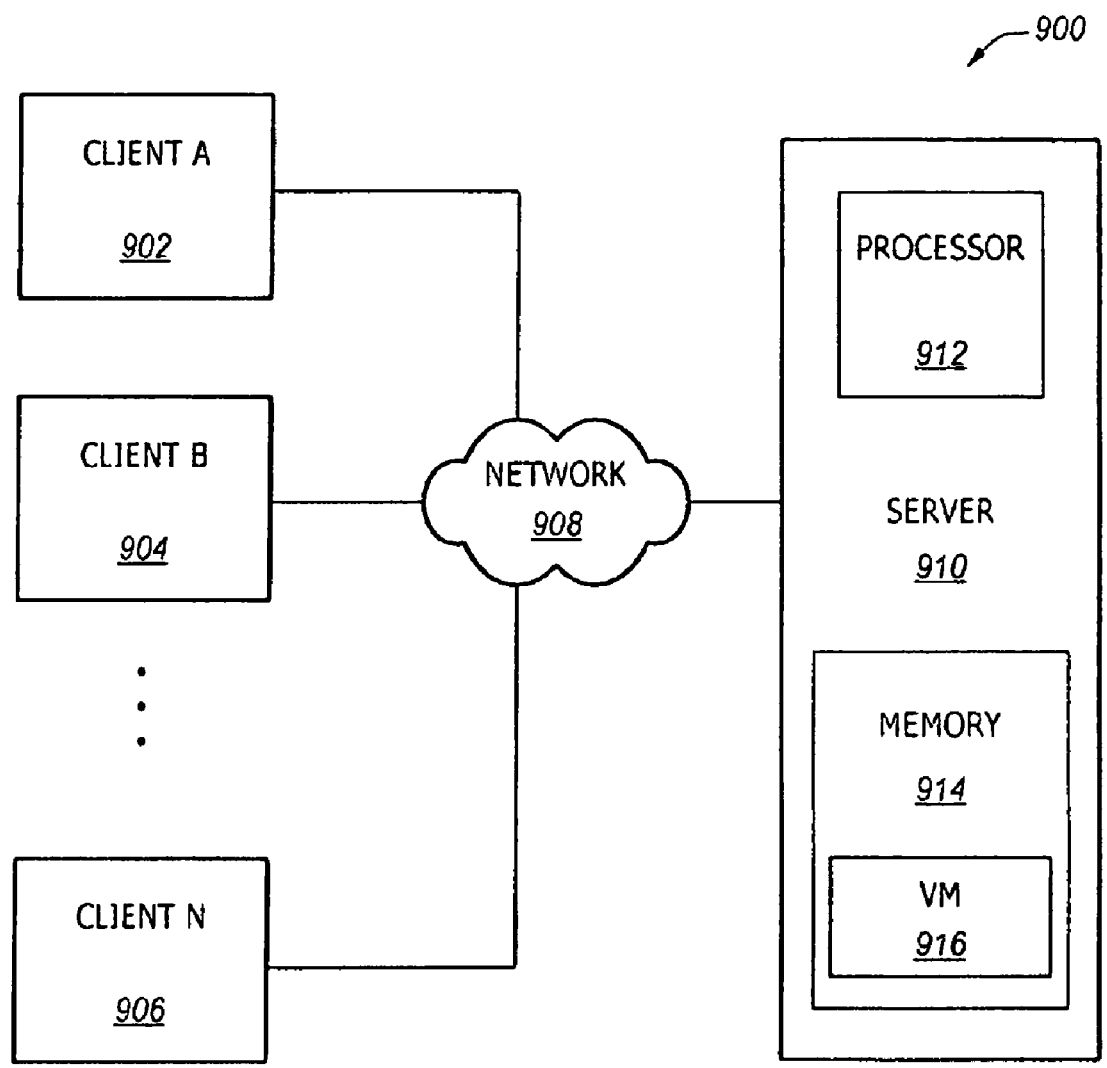
FIG. 9 illustrates an exemplary client/server system used for implementing an embodiment of the invention.

FIG. 9 illustrates an exemplary client/server system 900 used in implementing one or more embodiments of the invention. In the illustrated embodiment, a network 908 links a server 910 with various client systems A-N 902-906. The server 910 is a programmable data processing system suitable for implementing apparatus, programs, or methods in accordance with the description. The server 910 provides a core operating environment for one or more runtime systems that process user requests. The server 910 includes a processor 912 and a memory 914. The memory 914 can be used to store an operating system a Transmission Control Protocol/Internet Protocol (TCP/IP) stack for communicating over the network 908, and machine-executable instructions executed by the processor 912. In some implementations, the server 910 can include multiple processors, each of which can be used to execute machine-executable instructions.

The memory 914 can include a shared memory area that is accessible by multiple operating system processes executing at the server 910. An example of a suitable server to be implemented using the client/server system 900 may include J2EE compatible servers, such as the Web Application Server developed by SAP AG of Walldorf, Germany, or the WebSphere Application Server developed by International Business Machines Corp. (IBM®) of Armonk, N.Y.

Client systems 902-906 are used to execute multiple applications or application interfaces. Each instance of an application or an application interface can constitute a user session. Each user session can generate one or more requests to be processed by the server 910. The requests may include instructions or code to be executed on a runtime system (e.g., the virtual machine (VM) 916) on the server 910. A VM 916 is an abstract machine that can include an instruction set, a set of registers, a stack, a heap, and a method area, like a real machine or processor. A VM 916 essentially acts as an interface between program code and the actual processor or hardware platform on which the program code is to be executed. The program code includes instructions from the VM instruction set that manipulates the resources of the VM 916.

Figure 10:
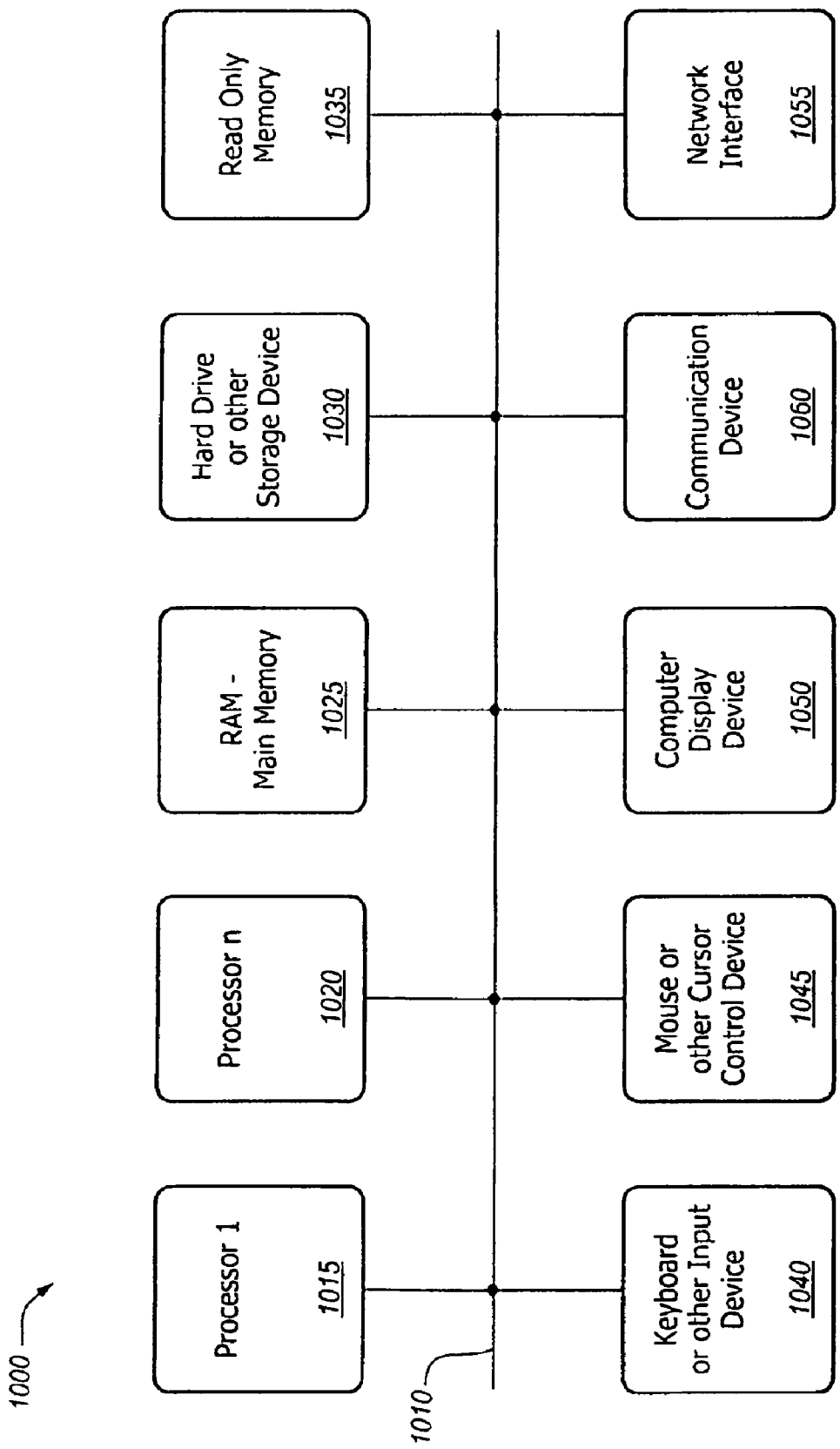
FIG. 10 is an exemplary computer system used in implementing an embodiment of the invention.

FIG. 10 is an exemplary computer system 1000 used in implementing an embodiment of the present invention. In this illustration, a system 1000 comprises a bus 1010 or other means for communicating data. The system 1000 includes one or more processors, illustrated as shown as processor 1 1015 through processor n 1020 to process information. The system 1000 further comprises a random access memory (RAM) or other dynamic storage as a main memory 1025 to store information and instructions to be executed by the processor 1015 through 1020. The RAM or other main memory 1025 also may be used for storing temporary variables or other intermediate information during execution of instructions by the processors 1015 through 1020.

A hard drive or other storage device 1030 may be used by the system 1000 for storing information and instructions. The storage device 1030 may include a magnetic disk or optical disc and its corresponding drive, flash memory or other non-volatile memory, or other memory device. Such elements may be combined together or may be separate components. The system 1000 may include a read only memory (ROM) 1035 or other static storage device for storing static information and instructions for the processors 1015 through 1020.

A keyboard or other input device 1040 may be coupled to the bus 1010 for communicating information or command selections to the processors 1015 through 1020. The input device 1040 may include a keyboard, a keypad, a touch-screen and stylus, a voice-activated system, or other input device, or combinations of such devices. The computer may further include a mouse or other cursor control device 1045, which may be a mouse, a trackball, or cursor direction keys to communicate direction information and command selections to the processors and to control cursor movement on a display device. The system 1000 may include a computer display device 1050, such as a cathode ray tube (CRT), liquid crystal display (LCD), or other display technology, to display information to a user. In some environments, the display device may be a touch-screen that is also utilized as at least a part of an input device. In some environments, the computer display device 1050 may be or may include an auditory device, such as a speaker for providing auditory information.

A communication device 1050 may also be coupled to the bus 1010. The communication device 1050 may include a modem, a transceiver, a wireless modem, or other interface device. The system 1000 may be linked to a network or to other device using via an interface 1055, which may include links to the Internet, a local area network, or another environment. The system 1000 may comprise a server that connects to multiple devices. In one embodiment the system 1000 comprises a JAVA® compatible server that is connected to user devices and to external resources.

While the machine-readable medium 1030 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1000 and that causes the machine to perform any one or more of the methodologies of the present invention. The term "machine-readable medium" shall accordingly be taken to include, but not be limited to, solid-state memories, optical and magnetic media, and carrier wave signals.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD-ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Furthermore, it is appreciated that a lesser or more equipped computer system than the example described above may be desirable for certain implementations. Therefore, the configuration of system 1000 may vary from implementation to implementation depending upon numerous factors, such as price constraints, performance requirements, technological improvements, and/or other circumstances.

It is noted that processes taught by the discussion above can be practiced within various software environments such as, for example, object-oriented and non-object-oriented programming environments, JAVA based environments, such as a J2EE environment or environments defined by other releases of the JAVA standard), or other environments (e.g., a .NET environment, a Windows/NT environment each provided by Microsoft Corporation).

It should be noted that, while the embodiments described herein may be performed under the control of a programmed processor, such as processors 1015 through 1020, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:
identifying web services properties associated with a web services model;
identifying web services client properties associated with a web services client model;
extracting common properties from the web services properties and the web services client properties; and
creating, using one or more processors, a single common model by using the common properties and unifying the web services model and the web services client model, the single common model comprising:
a Web Services Description Language (WSDL) model describing a structure of web services;
a WSDL interface mappings model describing mappings between a JAVA service endpoint interface and WSDL representation of the JAVA service endpoint interface;
a schema to JAVA mappings model describing mappings between schema definition types and JAVA classes representing the schema definition types; and
a configuration model describing a configuration of the web services model and the web services client model;
the configuration model referencing the WSDL model and the WSDL interface mappings model, the WSDL interface mapping model referencing the WSDL model and the schema to JAVA mappings model, and the schema to JAVA mappings model referencing the WSDL model;
the common model serving as a basis for development of web services corresponding to the web services model and for development of a web services client corresponding to the web services client model.

2. The method of claim 1, the development of the web services and the development of the web services client each comprising:
updating mapping information, the updated mapping information comprising updated interface mapping information and updated schema to JAVA mapping information;
storing the updated interface mapping information at the WSDL interface mappings model; and
storing the updated schema to JAVA mappings mapping information at the schema to JAVA mappings model.

3. The method of claim 1, wherein the configuration model having comprises configuration information relating to an interface described in a web services interface description included in the WSDL model.

4. A system having a memory and further comprising:
an identification module to:
identify web services properties associated with a web services model, identify web services client properties associated with a web services client model, and extract common properties from the web services properties and the web services client properties; and a generator, using a processor, to create a single common model by using the common properties and unifying the web services model and the web services client model, the single common model comprising:

a Web Services Description Language (WSDL) model describing a structure of web services;

a WSDL interface mappings model describing mappings between a JAVA service endpoint interface and a WSDL representation of the JAVA service endpoint interface;

a schema to JAVA mappings model describing mappings between schema definition types and JAVA classes representing the schema definition types; and a configuration model describing a configuration of the web services model and the web services client model;

the configuration model referencing the WSDL model and the WSDL interface mappings model, the WSDL interface mapping model referencing the WSDL model and the schema to JAVA mappings model, and the schema to JAVA mappings model referencing the WSDL model;

the common model serving as a basis for development of web services corresponding to the web services model and for development of a web services client corresponding to the web services client model.

5. The system of claim 4, further comprising an updating tool to:

update mapping information, the updated mapping information comprising updated interface mapping information and updated schema to JAVA mapping information, store the updated interface mapping information at the WSDL interface mappings model; and store the updated schema to JAVA mappings mapping information at the schema to JAVA mapping mappings model.

6. The system of claim 4, wherein the WSDL model comprises a web services interface description.

7. The system of claim 6, wherein the configuration model comprises configuration information relating to an interface described in the web services interface description.

8. The system of claim 4, wherein the common model includes a JAVA-based common model residing at a JAVA 2 Enterprise Edition (J2EE) engine.

9. A machine-readable storage medium having stored thereon data representing sets of instructions which, when executed by a machine, cause the machine to perform operations comprising:

identify web services properties associated with a web services model;

identify web services client properties associated with a web services client model;

extract common properties from the web services properties and the web services client properties; and create a single common model by using the common properties and unifying the web services model and the web services client model, the single common model comprising:

a Web Services Description Language (WSDL) model describing a structure of web services;

a WSDL interface mappings model describing mappings between a JAVA service endpoint interface and a WSDL representation of the JAVA service endpoint interface;

a schema to JAVA mappings model describing mappings between schema definition types and JAVA classes representing the schema definition types; and a configuration model describing a configuration of the web services model and the web services client model;

the configuration model referencing the WSDL model and the WSDL interface mappings model, the WSDL interface mapping model referencing the WSDL model and the schema to JAVA mappings model, and the schema to JAVA mappings model referencing the WSDL model;

the common model serving as a basis for development of web services corresponding to the web services model and for development of a web services client corresponding to the web services client model.

10. The machine-readable storage medium of claim 9, wherein the sets of instructions which, when executed by the machine, further cause the machine to:

update mapping information, the updated mapping information comprising updated interface mapping information and updated schema to JAVA mapping information;

store the updated interface mapping information at the WSDL interface mappings model; and store the updated schema to JAVA mappings mapping information at the schema to JAVA mappings model.

11. The machine-readable storage medium of claim 9, wherein the WSDL model comprises a web services interface description.

* * * * *